United States Patent
Youn

(10) Patent No.: US 10,033,544 B2
(45) Date of Patent: Jul. 24, 2018

(54) NOTIFICATION APPARATUS AND OBJECT POSITION NOTIFICATION METHOD THEREOF

(71) Applicant: SAMSUNG ELECTRONICS CO., LTD., Suwon-si, Gyeonggi-do (KR)

(72) Inventor: So-young Youn, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 89 days.

(21) Appl. No.: 15/196,234

(22) Filed: Jun. 29, 2016

(65) Prior Publication Data

US 2017/0005826 A1 Jan. 5, 2017

(30) Foreign Application Priority Data

Jul. 1, 2015 (KR) .................. 10-2015-0094284

(51) Int. Cl.
*H04W 4/02* (2018.01)
*H04L 12/28* (2006.01)
*H04M 1/03* (2006.01)
*H04W 88/06* (2009.01)

(52) U.S. Cl.
CPC .......... *H04L 12/2825* (2013.01); *H04M 1/03* (2013.01); *H04W 4/02* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 8,896,422 B2 | 11/2014 | Koch et al. | |
| 2002/0080036 A1 | 6/2002 | Rabanne et al. | |
| 2005/0116823 A1* | 6/2005 | Paulsen | G01S 5/06 340/539.13 |
| 2006/0092040 A1* | 5/2006 | Fishkin | G06K 7/10079 340/10.1 |
| 2007/0008120 A1* | 1/2007 | Smith | G06K 7/10108 340/539.26 |
| 2007/0208736 A1 | 9/2007 | Tanigawa et al. | |
| 2008/0238657 A1* | 10/2008 | Hupp | G08B 13/1409 340/539.1 |

(Continued)

FOREIGN PATENT DOCUMENTS

| | | |
|---|---|---|
| KR | 10-1023321 | 3/2011 |
| KR | 10-2012-0021029 | 3/2012 |
| KR | 10-1128644 | 3/2012 |

(Continued)

OTHER PUBLICATIONS

Search Report and Written Opinion dated Oct. 17, 2016 in counterpart International Patent Application No. PCT/KR2016/007049.

*Primary Examiner* — David Bilodeau
(74) *Attorney, Agent, or Firm* — Nixon & Vanderhye P.C.

(57) ABSTRACT

An apparatus and a method for notifying a position of an object are provided. The apparatus includes a communication circuitry, a processor configured to control the communication circuitry to receive information of an object from an electronic device, control to search for whether or not an object corresponding to the received information is located within a preset range through a preset wireless communication method, and control to perform a notification operation based on a result of the search.

18 Claims, 21 Drawing Sheets

(56) References Cited

U.S. PATENT DOCUMENTS

2008/0291004 A1 11/2008 Regan et al.
2015/0006499 A1* 1/2015 Stewart ............. G06F 17/30864
                                                                                   707/706

FOREIGN PATENT DOCUMENTS

KR        10-1343635      12/2013
KR   10-2015-0024166    3/2015

* cited by examiner

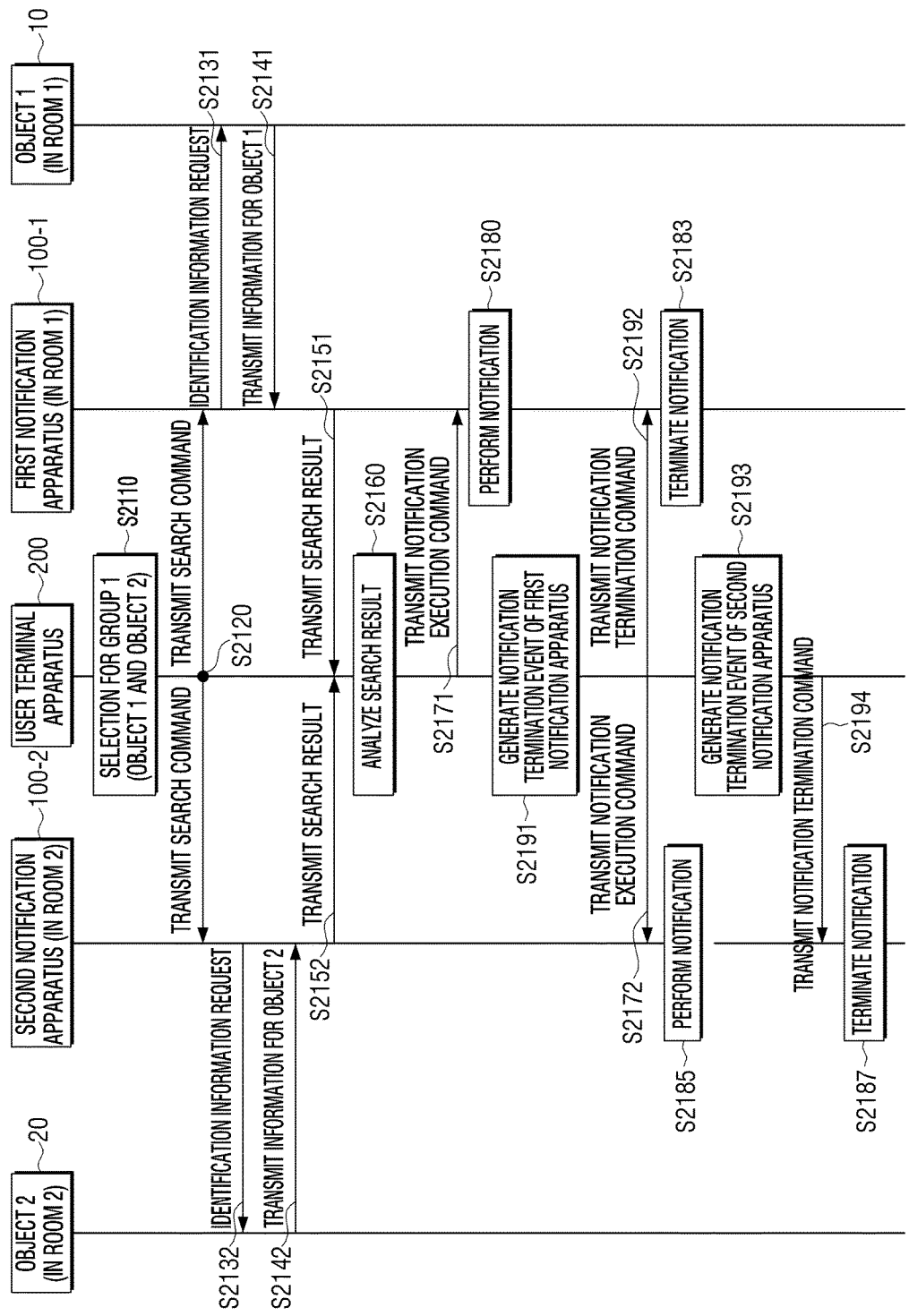

NOTIFICATION APPARATUS AND OBJECT POSITION NOTIFICATION METHOD THEREOF

CROSS-REFERENCE TO RELATED APPLICATIONS

This application is based on and claims priority under 35 U.S.C. § 119 to Korean Patent Application No. 10-2015-0094284, filed on Jul. 1, 2015, in the Korean Intellectual Property Office, the disclosure of which is incorporated by reference herein in its entirety.

BACKGROUND

Field

Apparatuses and methods consistent with example embodiments relate to a notification apparatus and an object position notification method thereof, and for example, to a notification apparatus capable of notifying a user of a position of an object and an object position notification method thereof.

Description of Related Art

With the development of electronic and communication fields, portable phones such as smart phones among terminal devices may have many various functions. For example, with the rapid development of data processing technology as well as wireless communication technology, user terminal apparatuses such as portable phones has served to perform various functions such as Internet connection, video communication, internet banking, and the like. With the rapid propagation of the portable phones, most of communication in human being relationship may be accomplished through portable phones, and thus mobile terminals have been sold as essential communication apparatuses in the modern life.

With the development of computer technology, communication technology, and home electronics technology, home network management services that in-home devices and systems are coupled and managed through a home network are emerged and are spotlighted as future-oriented technology.

Information appliances connected through the home network in home may exchange data with each other and may communicate with various user terminals. For example, the user may control all the home appliances connected through the home network in home using a user interface (UI) provided in the user terminal apparatus such as a portable phone regardless of time and a place.

In recent years, as part of utilization of the home network system, the research on directions for providing new service which closely approaches to the user's life have been accelerated beyond the inherent functions of the home appliances in home.

SUMMARY

Example embodiments address the above disadvantages and other disadvantages not described above.

One or more example embodiments relate to a notification apparatus capable of notifying a user of a position of an object and an object position notification method thereof.

According to an aspect of an example embodiment, a notification apparatus is provided, including a communication circuitry, a processor configured to control the communication circuitry to receive information for an object from an electronic device, control to search for whether or not an object corresponding to the received information is located within a preset range through a preset wireless communication method, and control to perform a notification operation based on a search result.

The processor may control the communication circuitry to receive a search result for the object from another notification apparatus, and control one of the other notification apparatus and the notification apparatus, which is closer to the object, to perform the notification operation based on a search result received from the other notification apparatus and a search result of the communication circuitry.

The processor may control the communication circuitry to transmit the information for the object to the other notification apparatus and to receive the search result for the object from the other notification apparatus.

The processor may request the search result for the object from another notification apparatus which is preregistered in response to the search result being not received within a preset time after the information for the object is received from the electronic device.

The processor may control the communication circuitry to transmit a notification execution command to the other notification apparatus in response to the other notification apparatus being determined to be closer to the object than the notification apparatus.

The processor may control the notification apparatus and the other notification apparatus to simultaneously perform the notification operation in response to proximity of the object in the notification apparatus being equal to that in the other notification apparatus.

The processor may determine a position of the object based on the search result received from the other notification apparatus and the search result of the communication circuitry and control the communication circuitry to transmit information for the determined position of the object to the electronic device.

The notification apparatus may further include a speaker configured to output a sound. The processor may control the speaker to perform the notification operation by outputting the sound.

The processor may control the communication circuitry to receive information of a distance between the electronic device and the object from the electronic device. The processor may control the speaker to output the sound by varying the sound based on the information of the distance between the electronic device and the object.

The processor may control the speaker to terminate an output of the sound based on the information of the distance between the electronic device and the object in response to the distance between the electronic device and the object being less than a preset distance.

The communication circuitry may support a first communication method and a second communication method different from the first communication method. The processor may control the communication circuitry to receive the information of the object from the electronic device through the first communication method and search for whether or not the object corresponding to the received information is located within the preset range through the second communication method.

The electronic device may be a smart phone, a smart watch, a digital camera, or a laptop personal computer (PC).

According to an aspect of another example embodiment, a method for notifying a position of an object by a notification apparatus is provided, the method including receiving information of an object from an electronic device; searching for whether or not an object corresponding to the received information is located within a preset range through a preset wireless communication method; and performing a notification operation based on a result of the searching.

The method may further include receiving a searching result for the object from another notification apparatus. The performing of the notification operation may include controlling one of the other notification apparatus and the notification apparatus based on which apparatus is closer to the object, to perform the notification operation based on the searching result received from the other notification apparatus and a searching result searched through the preset wireless communication method.

The receiving of the searching result for the object from the other notification apparatus may include transmitting information of the object to the other notification apparatus and receiving the searching result of the object from the other notification apparatus.

The method may further include requesting a searching result of the object to another notification apparatus which is preregistered in response to the searching result being not received within a preset time after the information of the object is received from the electronic device.

The performing of the notification operation may include transmitting a notification execution command to the other notification apparatus in response to the other notification apparatus being determined to be closer to the object than the notification apparatus.

The performing of the notification operation may include controlling the notification apparatus and the other notification apparatus to simultaneously perform the notification operation in response to proximity of the object in the notification apparatus being equal to that in the other notification apparatus.

The performing of the notification operation may include determining a position of the object based on the searching result received from the other notification apparatus and the searching result searched through the preset wireless communication method and transmitting information of the determined position of the object to the electronic device.

According to an aspect of another example embodiment, a non-transitory recording medium is provided in which a program for executing a method for notifying a position of an object by a notification apparatus is stored, the method including receiving information for an object from an electronic device; searching for whether or not an object corresponding to the received information is located within a preset range through a preset wireless communication method; and performing a notification operation based on a searching result.

According to various example embodiments, the user may receive information of a position of an object through a notification apparatus, and thus the user may effectively find an object.

Additional aspects and advantages of the example embodiments are set forth in the detailed description, and will be apparent from the detailed description.

BRIEF DESCRIPTION OF THE DRAWINGS

The above and/or other aspects will be more apparent from the following detailed description, taken in conjunction with the accompanying drawings, in which like reference numerals refer to like elements, and wherein:

FIGS. 10A and 10B to 12 are diagrams illustrating example object position providing methods of a user terminal apparatus according to various example embodiments;

FIGS. 18 to 21 are flow diagrams illustrating an example method for notifying a position of an object by a notification apparatus according to various example embodiments.

DETAILED DESCRIPTION

The example embodiments may be variously modified and have several forms. Therefore, specific embodiments of the disclosure will be illustrated in the accompanying drawings and be described in detail in the description. However, it is to be understood that the disclosure is not limited to a specific example embodiment, but includes all modifications, equivalents, and substitutions without departing from the scope and spirit of the disclosure. When it is decided that the detailed description of the known art related to the disclosure may obscure the gist of the disclosure, a detailed description therefor may be omitted.

Terms 'first', 'second', and the like, may be used to describe various components, but the components are not to be construed as being limited by the terms. The terms are used to distinguish one component from another component.

Terms used in the description are used only in order to describe example embodiments rather than limiting the scope of the present disclosure. Singular forms are intended to include plural forms unless the context clearly indicates otherwise. It will be further understood that the terms "comprises" or "configured of" used in this specification, specify the presence of features, numerals, steps, operations, components, parts mentioned in this specification, or a combination thereof, but do not preclude the presence or addition of one or more other features, numerals, steps, operations, components, parts, or a combination thereof.

In the example embodiments of the disclosure, a 'module' or a 'unit' performs at least one function or operation and may be implemented by hardware (e.g., circuitry), firmware and/or software or a combination of the hardware and the software. Further, a plurality of 'modules' or a plurality of 'units' are integrated into at least one module except for the 'module' or 'unit' which needs to be implemented by specific hardware and thus may be implemented by at least one processor (not illustrated).

Hereinafter, example embodiments will be explained in detail with reference to the accompanying drawings.

Figure 1:
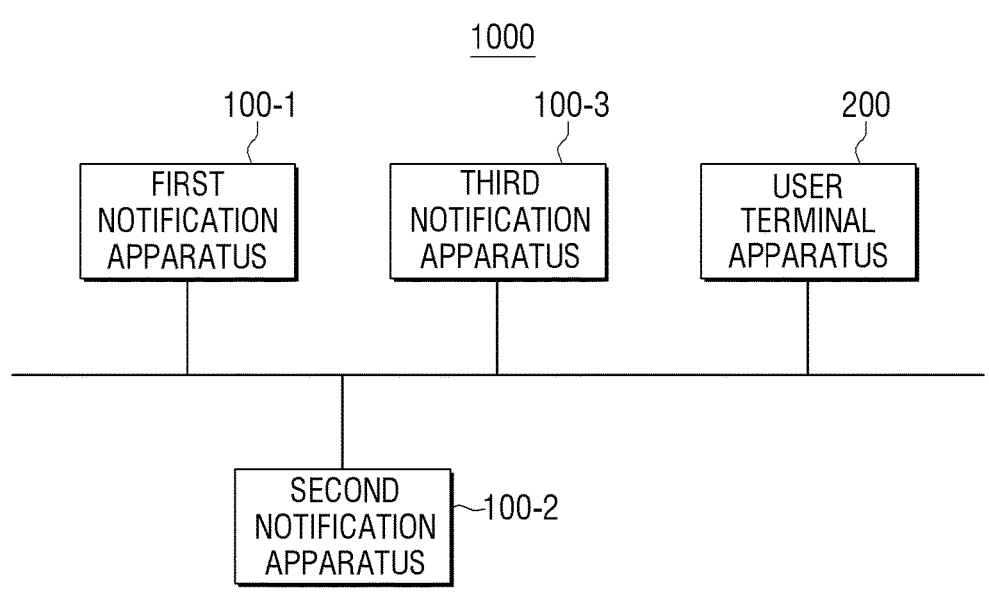
FIGS. 1 and 2 are diagrams illustrating an example system for providing object position notification service according to various example embodiments.

FIG. 1 is a diagram illustrating an example system for providing object position notification service according to an example embodiment.

Referring to FIG. 1, an object position notification service providing system 1000 may include one or more notification apparatuses 100-1, 100-2, and 100-3 and a user terminal apparatus 200. The number of notification apparatuses is not limited to the number of notification apparatuses 100-1, 100-2, and 100-3 illustrated in FIG. 1, and the system 1000 may include only one notification apparatus or more notification apparatuses.

The user terminal apparatus 200 can be also named an electronic device. The user terminal apparatus 200 may be an apparatus which may exchange a variety of information with the plurality of notification apparatuses 100-1, 100-2, and 100-3. For example, the user terminal apparatus 200 may transmit information of an object to be found by the user to at least one of the plurality of notification apparatuses 100-1, 100-2, and 100-3.

The user terminal apparatus 200 may, for example, be a portable type of apparatus such as a portable phone, a smart phone, a smart watch, a digital camera, a tablet PC, a personal digital assistant (PDA), an MP3 player, and a laptop PC, or the like.

The plurality of notification apparatuses 100-1, 100-2, and 100-3 may be an apparatus which may search for whether or not an object corresponding to the information of the object received from the user terminal apparatus 200 is located around the notification apparatus and notify the user of a position of the object. For example, the plurality of notification apparatuses 100-1, 100-2, and 100-3 may mutually share searching results thereof with each other and a notification apparatus closest to the object to be found by the user may perform the notification operation based on the shared searching result.

In an example embodiment, the plurality of notification apparatuses 100-1, 100-2, and 100-3 may share the searching results thereof with each other by transmitting the searching results thereof to other notification apparatuses 100-1, 100-2, and 100-3 and receiving the searching results from the other notification apparatuses 100-1, 100-2, and 100-3. In the example embodiment, the plurality of notification apparatuses 100-1, 100-2, and 100-3 may individually perform a determination operation and when any notification apparatus determines itself to be closest to the object, the notification apparatus may perform the notification operation.

In another example embodiment, any one of the plurality of notification apparatuses 100-1, 100-2, and 100-3 may be operated as a representative notification apparatus and the representative notification apparatus may synthesize the searching results of the representative notification apparatus and the other notification apparatuses, so that the plurality of notification apparatuses may share the searching results thereof. In the example embodiment, it may be the case that only the representative notification apparatus may perform the determination operation. In response to the representative notification apparatus itself being determined as the notification apparatus closest to the object, the representative notification apparatus may perform the notification operation. In response to another notification apparatus being determined as the notification apparatus closest to the object, the representative notification apparatus may transmit a control signal to the other notification apparatus so that the other notification apparatus performs the notification operation.

The plurality of notification apparatuses 100-1, 100-2, and 100-3 may notify the user of the position of the object through various methods. For example, the plurality of notification apparatuses 100-1, 100-2, and 100-3 may notify the user of the position of the object through various methods, for example, an audible effect output method, a visual effect output method, and a transmission method of data including position information to the user terminal apparatus 200.

The plurality of notification apparatuses 100-1, 100-2, and 100-3 may be implemented with any apparatus having the object search function, a communication function with other apparatuses, and a notification function. For example, a portable type of apparatus such as a portable phone, a tablet PC, a PDA, an MP3 player, or a laptop PC, or the like, may be set to perform a function of the notification apparatus. In another example, a furniture type home appliance such as a smart refrigerator, a television (TV), a washing machine, an audio or a movable home appliance such a robot cleaner, or the like may be set to perform the function of the notification apparatus.

To find the object through the system, the object to be found may communicate with the plurality of notification apparatuses 100-1, 100-2, and 100-3 through the wireless communication method used in the plurality of notification apparatuses 100-1, 100-2, and 100-3. Accordingly, the user may attach a communication apparatus to an object having no communication function, for example, the object such as a wallet in advance. For example, a sticker including the communication apparatus may be provided to the user and the user may attach the sticker to the object.

For example, the object (or the communication apparatus attached to the object) may perform communication with an external apparatus through a wireless communication method such as, for example, Wi-Fi, Bluetooth, Beacon, Zigbee, near field communication (NFC), ultra-wideband (UWB), radio-frequency identification (RFID), ultrasonic, infrared data association (IrDA), Z-wave, 4 low power wireless personal area network (4LoWPAN), long term evolution device to device (LTE D2D), Bluetooth low energy (BLE), general packet radio service (GPRS), Weightless, ANT+, digital enhanced cordless telecommunications (DECT), wireless local area network (WLAN), Wi-Fi Direct, global system for mobile communication (GSM), universal mobile telephone system (UMTS), LTE, and wireless broadband Internet (WiBro), or the like.

The object or the communication apparatus attached to the object may communicate with the plurality of notification apparatuses 100-1, 100-2, and 100-3 and the user terminal apparatus 200 so that the plurality of notification apparatuses 100-1, 100-2, and 100-3 and the user terminal apparatus 200 may identify the object. A signal intensity in the communication between the object or the communication apparatus attached to the object and at least one of the plurality of notification apparatuses 100-1, 100-2, and 100-3 or a distance between the object or the communication apparatus attached to the object and the user terminal apparatus 200 may be used to determine a distance between the object and at least one of the plurality of notification apparatuses 100-1, 100-2, and 100-3 or between the object and the user terminal apparatus 200. Such determination is based on the fact that a signal intensity is proportional to a distance. The technology for measuring a distance between communication apparatuses using received signal strength indication (RSSI) is generally known to those skilled in the art, and thus detailed description thereof will be omitted.

In the system which provides object position notification service according to another example embodiment, a separate apparatus which may function to control the plurality of notification apparatuses 100-1, 100-2, and 100-3 and synthesize the searching results of the plurality of notification apparatuses 100-1, 100-2, and 100-3 may be included. The system in the example embodiment will be described below with reference to FIG. 2.

Figure 2:
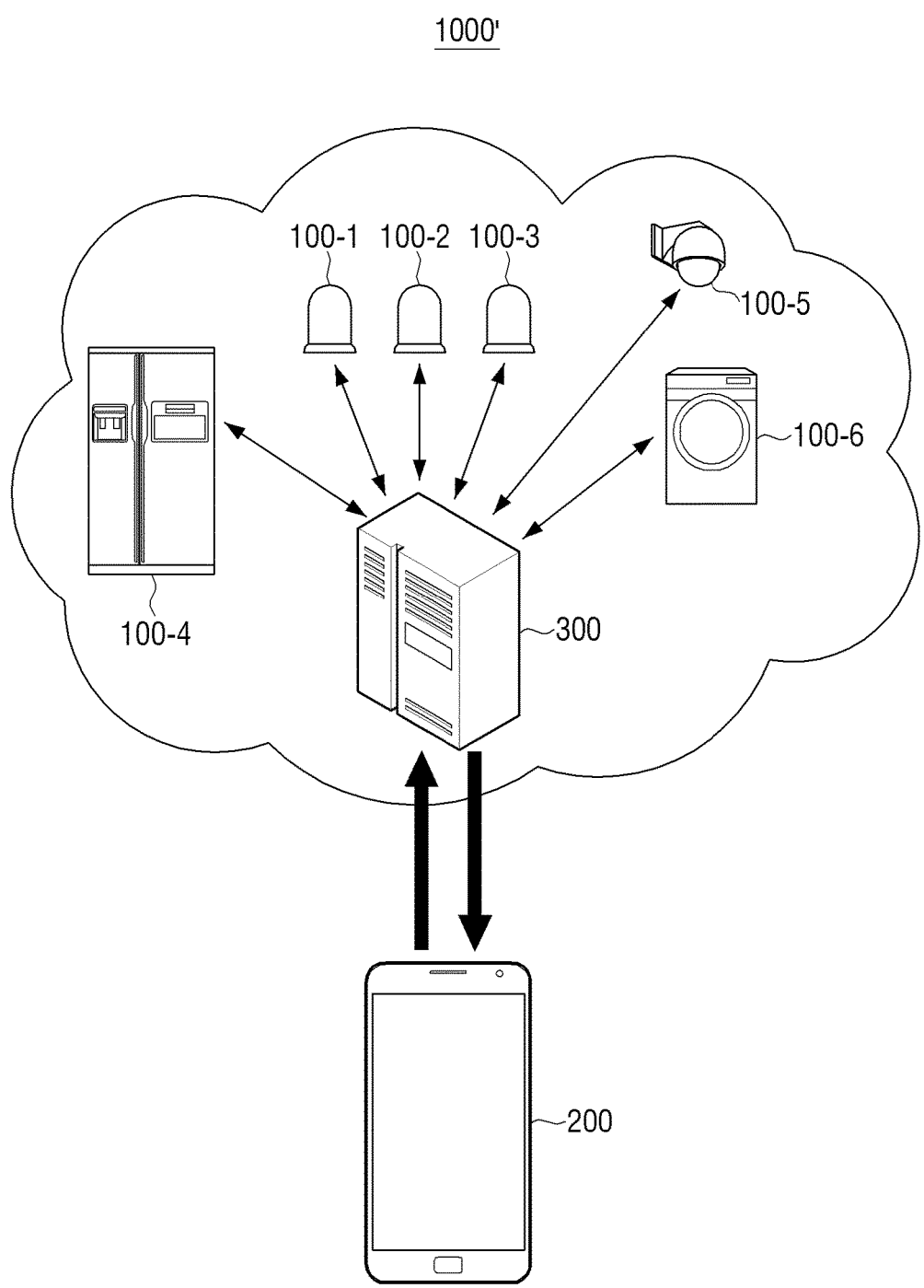

FIG. 2 is a diagram illustrating an example system 1000' for providing object position notification service according to another example embodiment.

The system 1000' may include a plurality of client apparatuses 100-1, 100-2, 100-3, 100-4, 100-5 and 100-6, a server 300, and a user terminal apparatus 200.

In response to the system 1000' being applied to private home, the system 1000' may refer to a home network system which performs home network management. The home network management may refer, for example, to a concept which includes control of in-home apparatus coupled through a network, status analysis of the apparatus, risk situation detection in home, information exchange between family members, and the like and the system 1000' may perform the home network management through the server 300.

The user terminal apparatus 200 may display a UI screen which is designed to easily manage the home network system through the user. The user terminal apparatus 200 may transfer a control command and the like for controlling the plurality of client apparatuses 100-1 to 100-6 or receive various status information of the plurality of client apparatuses 100-1 to 100-6, in-home risk status detection information, and the like by communicating with the server 300 based on a user input through the UI screen. For example, the user terminal apparatus 200 may receive information for positions of objects around the plurality of client apparatuses 100-1 to 100-6.

The server 300 may, for example, be in charge of control, management, linkage, and the like of the plurality of client apparatuses 100-1 to 100-6.

The server 300 may, for example, be an apparatus which may receive a command from the user terminal apparatus 200 and control the plurality of client apparatuses 100-1 to 100-6 based on the command.

The server 300 may control a notification operation in a notification apparatus which performs the function of the notification apparatus among the plurality of client apparatuses 100-1 to 100-6. All the client apparatuses 100-1 to 100-6 may be perform the function of the notification apparatus or a portion of the client apparatuses 100-1 to 100-6 may perform the function of the notification apparatus. Hereinafter, for clarity and ease of explanation, it will be described that the client apparatuses 100-1, 100-2, and 100-3 among the plurality of client apparatuses 100-1 to 100-6 may perform the function of the notification apparatus.

The server 300 may control the plurality of notification apparatuses 100-1, 100-2, and 100-3 to search surrounding objects in response to an object search command being received from the user terminal apparatus 200. The server 300 may control a notification apparatus closest to an object corresponding to the object search command received from the user terminal apparatus 200 to perform the notification operation based on the searching results received from the plurality of notification apparatuses 100-1, 100-2, and 100-3.

The user having the user terminal apparatus 200 may search for an object in home by communicating with the server 300 even outside the home.

The plurality of notification apparatuses 100-1, 100-2, and 100-3 may be disposed in several places in the home and may perform the function of notifying the user of a position of an object to be found by the user. For example, as illustrated in FIG. 3, the plurality of notification apparatuses 100-1, 100-2, and 100-3 may be disposed in each room.

Figure 3:
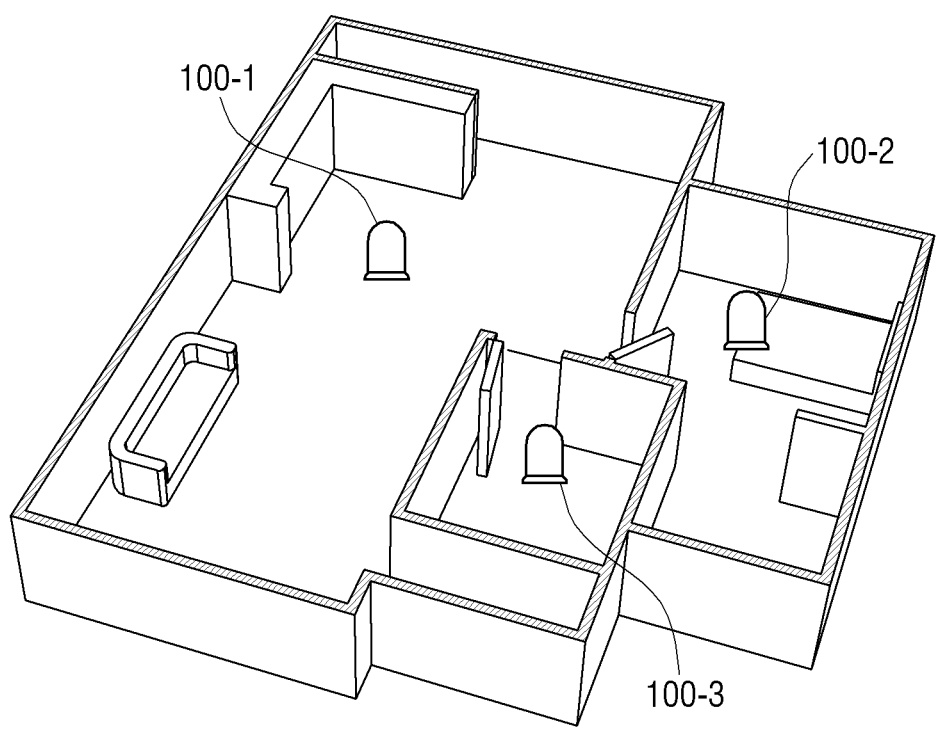
FIG. 3 is a diagram illustrating an example arrangement form of a plurality of notification apparatuses according to an example embodiment.

Referring to FIG. 3, the plurality of notification apparatuses 100-1, 100-2, and 100-3 disposed in each room may perform different notification operations from each other. For example, the plurality of notification apparatuses 100-1, 100-2, and 100-3 disposed in each room may output different sounds from each other. A plurality of notification apparatuses disposed in the same room may output the same sound. Since the sounds in each room are different, the user may determine sound types and go to a room corresponding to the sound even in response to positions in which the sound is output being confused.

According to an example embodiment, the system may be used to find an object and to help the blind in the daily lives. For example, the user terminal apparatus 200 may control a specific notification apparatus corresponding to the user operation to perform the notification operation. In this example, the user terminal apparatus 200 may support a voice recognition function and in response to "main room" being uttered by the user, the user terminal apparatus 200 may transmit a control command so that a notification apparatus in a main room may perform the notification operation. The blind may go to the main room by hearing the uttered sound.

Hereinafter, configurations included in the systems according to various example embodiments will be described in greater detail.

Figure 4:
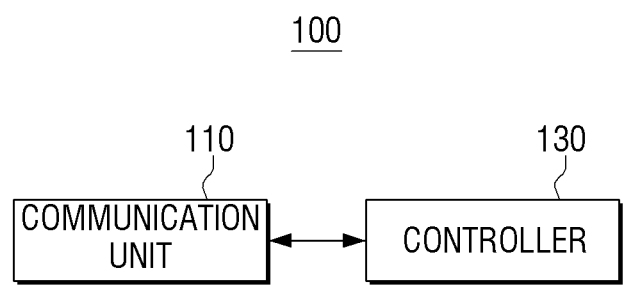
FIG. 4 is a block diagram illustrating an example notification apparatus according to an example embodiment.

FIG. 4 is a diagram illustrating an example notification apparatus according to an example embodiment.

Referring to FIG. 4, a notification apparatus 100 may include a communication unit (e.g., including communication circuitry) 110 and a controller 130.

The communication unit 110 may be configured to perform communication with an external apparatus. For example, the communication unit 110 may receive information for an object from the user terminal apparatus 200. The communication unit 110 may receive a searching result for the object from another notification apparatus. The communication unit 110 may transmit a searching result to another notification apparatus.

The communication unit 110 may be connected to an external apparatus through a local area network (LAN) and an Internet network. The communication unit 110 may, for example, be connected to the external apparatus through a wireless communication method using various example communication circuitry (for example, Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi Direct, GSM, UMTS, LTE, WiBro or the like).

The communication unit 110 may perform a search for an object around the notification apparatus 100. The communication unit 110 may search for whether or not an object corresponding to information received from the user terminal apparatus 200 is located within a preset range through a preset wireless communication method. The preset range may be set to a range communicable through the preset wireless communication method or may be arbitrarily set by the user. For example, the user may set a search area of the communication unit 110 based on a size of a room in which the notification apparatus 100 is disposed.

For example, the communication unit 110 may search for whether or not an object is located within the preset range by communicating the object or a communication apparatus attached to the object through the wireless communication method using communication circuitry, such as Wi-Fi, Bluetooth, Beacon, Zigbee, NFC, UWB, RFID, Ultrasonic, IrDA, Z-wave, 4LoWPAN, LTE D2D, BLE, GPRS, Weightless, ANT+, DECT, WLAN, Wi-Fi Direct, GSM, UMTS, LTE, and WiBro, or the like.

The communication unit 110 can be also named a communication circuitry, and the communication circuitry may include various communication chips such as a WIFI chip, a Bluetooth chip, a NFC chip, and a wireless communication chip. The WIFI chip, the Bluetooth chip, and the NFC chip may perform communication in a WIFI manner, a Bluetooth manner, and an NFC manner, respectively. Among the communication chips, the NFC chip may be a chip configured to operate in the NFC manner using a band of 13.56 MHz among various radio frequency identification (RF-ID) frequency bands such as 135 kHz, 13.56 MHz, 433 MHz, 860 to 960 MHz, and 2.45 GHz. In response to the WIFI chip or the Bluetooth chip being used, the communication unit 110 may first transmit/receive a variety of connection information such as a service set identifier (SSID) and a session key, perform communication connection using the connection information, and transmit/receive a variety of information. The wireless communication chip may be a chip configured to perform communication according to various communication standards, such as Institute of Electrical and Electronics Engineers (IEEE), Zigbee, 3rd generation (3G), 3rd Generation Partnership Project (3GPP), or Long Term Evolution (LTE).

According to an example embodiment, the communication unit 110 may support various communication methods including a first communication method and a second communication method different from the first communication method. The communication unit 110 may perform communication with the user terminal apparatus 200 or another notification apparatus through the first communication method and search an object through the second communication method. The second communication method may correspond to a relatively long-range communication method as compared with the first communication method.

For example, in response to a short-range wireless communication method (for example, a communication method communicable within a range of several meters such as Bluetooth or Beacon) being supported in the object or the communication apparatus attached to the object, the communication unit 110 may search the object through the second communication method as the short-range wireless communication method. The communication unit 110 may perform communication with the user terminal apparatus 200 or another notification apparatus far from the communication unit 110 using the first communication method (for example, Wi-Fi communication method and the like) as the relatively long-range wireless communication method. The system in the example embodiment may be suitable in response to only the short-range wireless communication method being supported in the object. For example, in response to only the short-range wireless communication method being supported in the object, the user may not find an object by communicating with the object far from the user using the user terminal apparatus 200, but the user may receive the notification for the position of the object through the notification apparatus 100.

The controller 130 may be configured to control an overall operation of the notification apparatus 100. For example, the controller 130 may control the communication unit 110 to transmit and receive a variety of data to and from an external apparatus and control the communication unit 110 to search for a neighboring object. The controller 130 can be also named a processor.

The controller 130 may control a notification apparatus of the other notification apparatus and the notification apparatus 100, which is closer to the object corresponding the information received from the user terminal apparatus 200, to perform the notification operation based on the searching result received from the other notification apparatus through the communication unit 110 and the searching result of the communication unit 110.

The controller 130 may control the communication unit 110 to request the searching result for the object from another notification apparatus which is preregistered in response to the searching result being not received from the other terminal apparatus within a preset time after the information for the object is received from the user terminal apparatus 200. The controller 130 may control the communication unit 110 to transmit the search result for the object searched in the communication unit 110 to the other notification apparatus.

In response to the notification apparatus 100 being determined as the notification apparatus closer to the object, the controller 130 may control the notification apparatus 100 to perform the notification operation.

In response to the other notification apparatus being determined as the notification apparatus closer to the object, the controller 130 may control the notification apparatus to not perform the notification operation.

In response to the notification apparatus 100 being operated as the representative apparatus differently from the other notification apparatus and the other notification apparatus being determined as the notification apparatus closer to the object, the controller 130 may control the other notification apparatus to perform the notification operation. For example, the controller 130 may transmit a notification execution command to the other notification apparatus through the communication unit 110.

In response to the notification apparatus 100 being operated as the representative notification apparatus and the information for the object being received from the user terminal apparatus 200 through the communication unit 110, the controller 130 may control the communication unit 110 to perform a search operation and control the communication unit 110 to transmit the information for the object to the other notification apparatus so that the other notification apparatus may perform the search operation. The controller 130 may control the other notification apparatus to transmit the search result to the notification apparatus 100.

The operation of the representative notification apparatus which controls the other notification apparatus may be performed by a separate external apparatus. For example, as described in FIG. 2, the separate server may function to control the plurality of notification apparatuses.

In response to proximity of the notification apparatus 100 with respect to the object corresponding to the information received from the user terminal apparatus 200 being the same as that of the other notification apparatus, the controller 130 may control the notification apparatus 100 and the other notification apparatus to simultaneously perform the notification operation. Therefore, the user may intuitively determine that the object is located in a middle position between the notification apparatus 100 and the other notification apparatus.

The notification apparatus 100 may notify the user of the position of the object through various methods.

For example, the notification apparatus 100 may include a speaker which outputs a sound and the controller 130 may control the speaker to output the sound so that the notification apparatus 100 may perform the notification operation.

In another example, the notification apparatus 100 may include a light emitter which emits light, and the controller 130 may control the light emitter to emit the light so that the notification apparatus 100 may perform the notification operation. The notification apparatus may be implemented with various apparatuses having a display. For example, in response to the notification apparatus being implemented with a TV, an electronic frame, and the like, the notification apparatus may perform the notification operation through flickering of a screen displayed in the display provided in the notification apparatus or through display of a specific graphic object in the screen.

In another example, the notification apparatus 100 may perform the notification operation by transmitting the information for the position of the object to the user terminal apparatus 200 through the communication unit 110. The transmitted information may be displayed on a display of the user terminal apparatus 200. The user terminal apparatus 200 in the example embodiment will be described in greater detail below.

The notification apparatus 100 may notify the user of how close the user is to the object by varying a notification level. For example, as a distance between the user and the object is reduced, the controller 130 may control the speaker to increase the volume of the sound or to fast output the sound. In another example, as the distance between the user and the object is reduced, the controller 130 may control the light emitter to increase a flickering rate of the light or to increase an intensity of the light.

Other than the above-described notification operations, any notification operation which can stimulate any one of the senses of the user may be employed. For example, the user terminal apparatus 200 other than the notification apparatus 100 may perform the notification operation. In response to the user terminal apparatus 200 being an apparatus which generates vibration, as the distance between the user terminal apparatus 200 and the object being reduced, a vibration intensity of the user terminal apparatus 200 may be increased.

In response to the distance between the user and the object being less than a preset distance, the controller 130 may terminate the notification operation. This is because the reduction in the distance between the user and the object means that the user finds the object, and thus the notification operation is not necessary any more. In another example embodiment, the controller 130 may terminate the notification operation in response to a notification termination command being received from the user terminal apparatus 200 through the communication unit 110.

The notification apparatus 100 may acquire the distance between the user and the object from the user terminal apparatus 200. For example, the user terminal apparatus 200 may communicate with the object or the communication apparatus attached to the object and determine the distance to the object or the communication apparatus attached to the object based on a communication signal intensity. The user terminal apparatus 200 may transmit the information for the determined distance to the notification apparatus 100. In another example, the user terminal apparatus 200 may transmit information for the communication signal intensity to the notification apparatus 100 and the controller 130 may determine the distance.

As described above, the notification apparatus 100 may perform the notification operation by transmitting the information for the position of the object to the user terminal apparatus 200 through the communication unit 110. For example, the controller 130 may determine the distance between the notification apparatus 100 and the object based on the communication signal intensity between the communication unit 110 and the object and provide information for the determined distance to the user terminal apparatus 200.

The object may not be accurately determined only by the information for the distance between the notification apparatus 100 and the object. According to an example embodiment, a plurality of notification apparatuses may cooperate with each other to more accurately determine the position of the object. For example, in response to the notification apparatus 100 being operated as the representative notification apparatus, the controller 130 may determine the accurate position of the object based on search results received from at least two or more other notification apparatuses and the search result for the object searched through the communication unit 110. Such an operation in the example embodiment will be described below with reference to FIG. 5.

Figure 5:
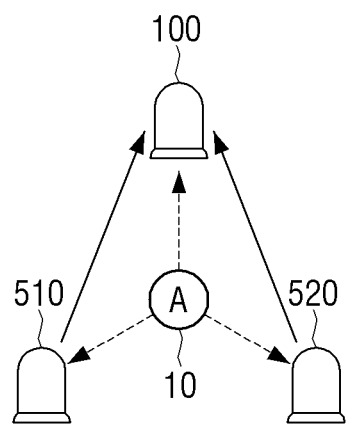
FIG. 5 is a diagram illustrating an example object position measurement method according to an example embodiment.

FIG. 5 is a diagram illustrating an example method of determining an accurate position of an object by the notification apparatus 100 according to an example embodiment.

Referring to FIG. 5, at least three or more notification apparatuses 100, 510, and 520 may receive a signal broadcast from an object 10 as indicated by a dotted line. The notification apparatuses 100, 510, and 520 may determine distances to the object 10 based on an intensity of the received signal. The notification apparatus 100 as the representative notification apparatus may receive information for the distance to the object from the other notification apparatuses 510 and 520 as indicated by a solid line. Since the information for positions of the other notification apparatuses 510 and 520 are pre-stored in the notification apparatus 100 operated as the representative notification apparatus, the notification apparatus 100 may determine the accurate position of the object based on the information for the distances to the object received from the other notification apparatuses 510 and 520 and the distance to the object acquired in the notification apparatus 100. Such a method is a type of triangulation, and according to various example embodiments, other types of measurement methods may be used to determine the accurate position of the object. This method is may be known to those skilled in the art, and thus detailed description thereof will be omitted.

The controller 130 may transmit the information for the position of the object determined as described above to the user terminal apparatus 200. For example, the position of the object may be displayed in a map form or a text form in a display of the user terminal apparatus 200. In another example, the information for the position of the object may be output in a sound form through a speaker of the user terminal apparatus 200.

The object to be found by the user may not be present in the home. Accordingly, the object may not be presented in a search result of the notification apparatus 100 and a search result of the other notification apparatus. The controller 130 of the notification apparatus 100 operated as the representative notification apparatus may transmit the search results to the user terminal apparatus 200 through the communication unit 110 in response to the object being not presented even in the search result of the communication unit 110 and the search result received from the other notification apparatus. A message such as "There is no object" may be included in the transmitted search result.

According to the above-described various example embodiments, the notification apparatus 100 may induce the user to a place in which the object is located by performing the notification operation, may induce the user to approach the object while varying the notification operation, and thus may help the user to find the object lost by the user. The notification apparatus 100 may provide the user of the various notification operations in a combined form. For example, the notification apparatus 100 may perform the notification operation by outputting the sound and simultaneously may transmit the information for the position of the object to the user terminal apparatus 200. Accordingly, the user may find the object using both vision and sound, and thus the user may easily find the object as compared with only using of any one of the visual and the auditory signal.

The various example embodiments described herein may be implemented within a recoding medium readable by a computer or an apparatus similar to the computer using software, hardware, or a combination thereof. In the hardware implementation, the example embodiments described herein may be implemented using at least one among application-specific integrated circuits (ASCIs), digital signal processors (DSPs), digital signal processing devices (DSPDs), programmable logic devices (PLDs), field programmable gate arrays (FPGAs), processors (e.g., including a CPU), controllers, micro-controllers, microprocessors, and electrical units for performing other functions. In some embodiments, the exemplary embodiments described herein may be implemented with the controller 130 itself. In the software implementation, the example embodiments such as a procedure and a function described herein may be implemented with separate software modules. Each of the software modules may perform one or more functions and operations described herein.

Hereinafter, a user terminal apparatus which provides an object search function together with the above-described notification apparatus 100 will be described.

Figure 6:
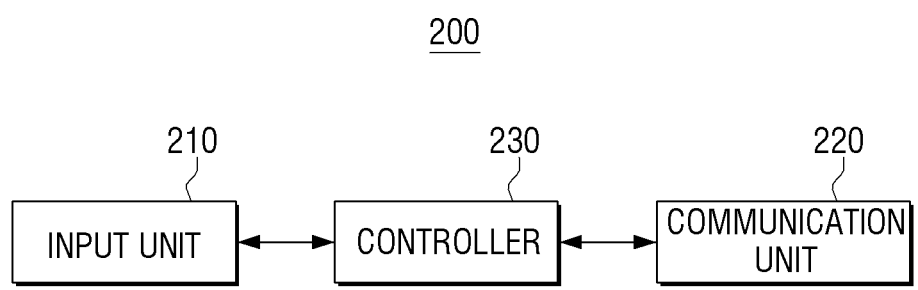
FIG. 6 is a block diagram illustrating an example user terminal apparatus according to an example embodiment.

FIG. 6 is a block diagram illustrating an example user terminal apparatus according to an example embodiment.

Referring to FIG. 6, the user terminal apparatus 200 may include an input unit (e.g., including input circuitry) 210, a communication unit (e.g., including communication circuitry) 220, and a controller 230.

The user terminal apparatus 200 include all information communication apparatuses supporting functions in the exemplary embodiments, and all devices using an application processor (AP), a graphic processing unit (GPU), and a central processing unit (CPU) such as a multimedia apparatus and an application apparatus thereto. For example, the user terminal apparatus 200 may include devices such as a tablet PC, a smart phone, a digital camera, a portable multimedia player (PMP), a media player, a portable gaming terminal, a laptop PC, and a personal digital assistant (PDA) in addition to a mobile communication terminal which may be operated by communication protocols corresponding to various communication systems, or the like. The function control method according to an example embodiment may be applied to various display devices such as a digital TV, a digital signage (DS), and a large format display (LFD), or the like, and employed.

The input unit 210 may include various input circuitry configured to detect an input for controlling the user terminal apparatus 200. For example, the input unit 210 may detect the user input for selecting an object.

The input unit 210 may be implemented with various input circuitry including, for example, a touch screen, but this is merely an example. The input unit 210 may be implemented with other input circuitry such as, for example, and without limitation, a mouse or a pointing device. The input unit 210 may include a sensor (for example, an acceleration sensor, a gyro sensor, a gravity sensor, and the like) configured to detect a motion of the user terminal apparatus 200.

The communication unit 220 may include various communication circuitry configured to perform communication with an external apparatus. The communication unit 220 may perform communication with the notification apparatus described above and perform communication with the object or the communication apparatus attached to the object. For example, the communication unit 220 may transmit information for an object selected by the user to the notification apparatus.

The communication unit 220 may be connected to an external apparatus through a LAN and an Internet network. The communication unit 220 may be connected to the external apparatus in a wireless communication manner such as Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi direct, GSM, UMTS, LTE, or WiBro.

The communication unit 220 can be also named a communication circuitry, and the communication circuitry may include various communication chips such as a WIFI chip, a Bluetooth chip, a NFC chip, and a wireless communication chip. The WIFI chip, the Bluetooth chip, and the NFC chip may perform communication in a WIFI manner, a Bluetooth manner, and an NFC manner, respectively. Among the communication chips, the NFC chip may be a chip configured to operate in the NFC manner using a band of 13.56 MHz among various RF-ID frequency bands such as 135 kHz, 13.56 MHz, 433 MHz, 860 to 960 MHz, and 2.45 GHz. In response to the WIFI chip or the Bluetooth chip being used, the communication unit 110 may first transmit/receive a variety of connection information such as an SSID and a session key, perform communication connection using the connection information, and transmit/receive a variety of information. The wireless communication chip may be a chip configured to perform communication according to various communication standards, such as IEEE, Zigbee, 3G, 3GPP, or LTE.

The controller 230 may be configured to control an overall operation of the user terminal apparatus 200. For example, the controller 230 may perform the control operation according to the user input detected through the input unit 210 and may control the communication unit 220 to transmit/receive a variety of data. The controller 230 may be also named a processor.

In response to a user operation for selecting a search target object being detected in the input unit 210, the controller 230 may transmit information for a selected search target object to the notification apparatus. In an example embodiment, the controller 230 may transmit the information for the search target object to all a plurality of preregistered notification apparatuses. In another example embodiment, the controller 230 may transmit the information for the search target object only to the representative notification apparatus among the plurality of preregistered notification apparatuses.

The user terminal apparatus 200 may include a display and user may select an object to be found through a screen provided from the display.

The display of the user terminal apparatus 200 may be configured to display various screens including a menu for a function provided from the user terminal apparatus 200, other messages, and the like under the control of the controller 230. For example, the display may be implemented with a touch screen combined with a touch sensor. The touch sensor may be implemented in a capacitive type or a resistive type. The capacitive type touch sensor may determine a touch coordinate by detecting micro electricity induced to a body of the user using a dielectric coated on a surface of the display in response to a portion of the body of the user being touched on the surface of the display. The resistive type touch sensor may include two electrode plates and determine a touch coordinate by detecting a current flowing through contact of upper and lower electrode plates at a touched point in response to the point of the screen being touched by the user. Such a touch sensor may be implemented in various types.

The display may be implemented, for example, with a liquid crystal display (LCD). In some examples, the display may be implemented with a cathode-ray tube (CRT), a plasma display panel (PDP), an organic light emitting diode (OLED), and the like. The display may be implemented in a touch screen form which may detect a touch operation of the user.

Figure 7:
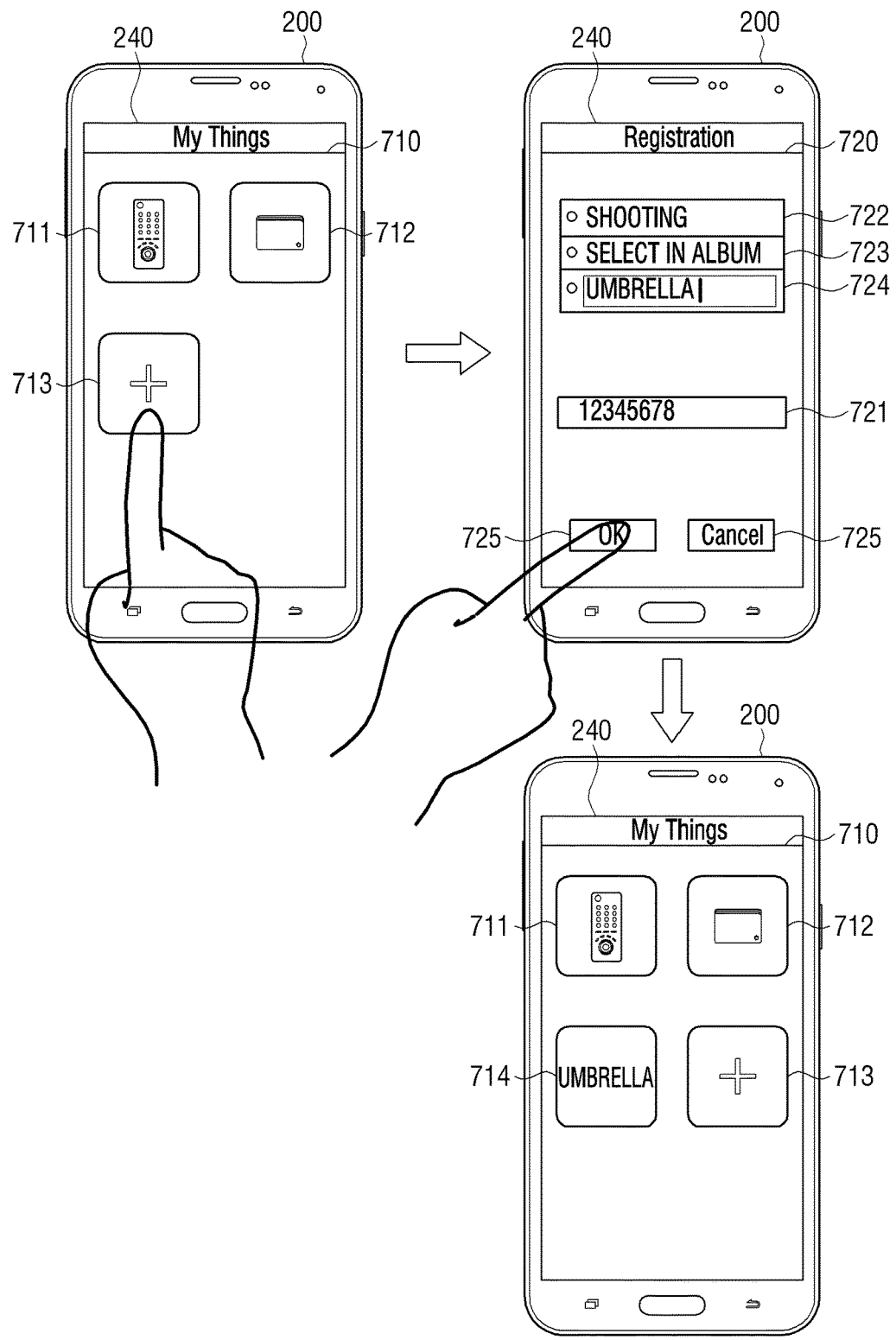
FIGS. 7 and 8 are diagrams illustrating UI screens provided by a user terminal apparatus according to various example embodiments.

FIG. 7 is a diagram illustrating an example UI screen displayable in a display of the user terminal apparatus 200 according to an example embodiment.

Referring to FIG. 7, the controller 230 may display a UI screen 710 for managing preregistered objects (things) through a display 240 of the user terminal apparatus 200.

For example, graphic objects 711 and 712 corresponding to the preregistered objects may be displayed in the display 240 of the user terminal apparatus 200. In response to the icon 712 corresponding to a wallet being selected to find the wallet by the user, the controller 230 may transmit stored unique information for the wallet to the plurality of notification apparatuses or the representative notification apparatus through the communication unit 220.

The following illustrative process may be performed to register an object in the user terminal apparatus 200. For example, a graphic object 713 for new object registration being selected by the user, the display 240 may display a UI screen 720 for the new object registration, and the user may input unique information (or identification information) of an object (for example, a communication apparatus attached to the object) to a unique information input column 721. The unique information may be used to identify the object in the user terminal apparatus 200 and the notification apparatus.

In this example, information to be used to represent the object may also be input. For example, in response to a menu "shooting" 722 being selected, a camera provided in the user terminal apparatus 200 may be driven and the user may shoot the object using the camera. The shoot image may be used to represent the object. In another example, in response to a menu "select in album" 723 being selected, an image list pre-stored in the user terminal apparatus 200 may be displayed, and an image selected from the image list may be used to represent the object. In another example, an object name directly typed in an "object name direct input column" 724 by the user may be used to represent the object.

In response to an OK button 725 being selected after the user directly types an object name in the object name input column 724, the unique information for the object may be stored in a storage unit of the user terminal apparatus 200 and thus the registration for the object may be completed. Then, the management UI screen 710 including the newly registered object may be displayed in the display 240, and text "umbrella" 714 directly typed by the user may be used as a graphic object representing the newly registered object.

The user may attach the registration-completed communication apparatus to the umbrella. In response to the graphic object 714 corresponding to the umbrella being selected, the unique information corresponding to the umbrella may be transmitted to the plurality of notification apparatuses or the representative notification apparatus, and thus the notification apparatus may perform a search operation on the umbrella.

It has been described in the example embodiment that the user registers a new object by directly typing a unique number. However, in response to an NFC communication method being supported in the communication apparatus to be attached to the object and the user terminal apparatus 200, the user terminal apparatus 200 may register the communication apparatus by simply acquiring the unique information of the communication apparatus through an operation of tagging the communication apparatus and the user terminal apparatus 200.

In another example embodiment, the user terminal apparatus 200 may provide a list for objects frequently found by the user. The storage unit of the user terminal apparatus 200 may store information with respect to a history that the user found the objects. Based on the history information, the controller 230 may display a screen including graphic objects for the objects, which are found preset number or more times by the user, in the display 240 or may display a screen that the graphic objects are listed in frequently found object order in the display 240.

The user may find a plurality of objects at once through the user terminal apparatus 200. For example, a function for selecting the plurality of objects may be provided in the management UI screen 710 of FIG. 7.

In another example embodiment, for more convenience of the user, the user terminal apparatus 200 may provide a function of managing the plurality of objects by grouping the plurality of objects. Through the function, the user may find the plurality of objects at once through a simple operation. The function in the example embodiment will be described below with reference to FIG. 8.

Figure 8:
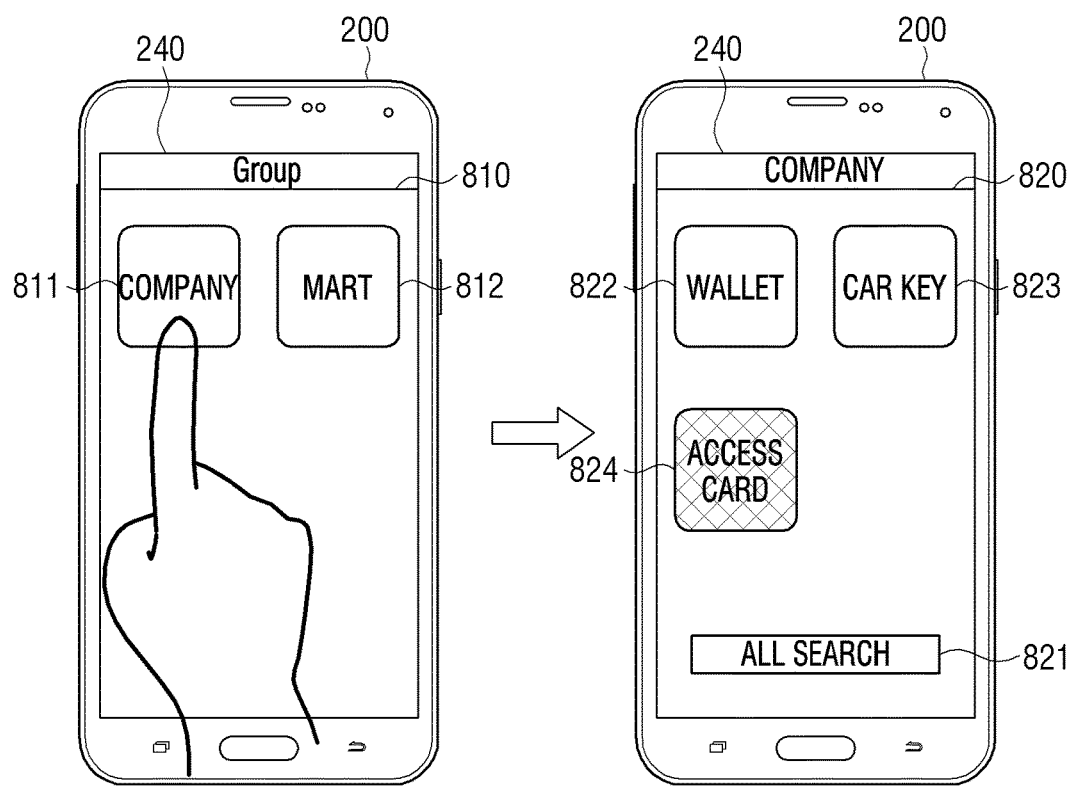

FIG. 8 is a diagram illustrating an example group management function provided from the user terminal apparatus 200 according to an example embodiment.

Referring to FIG. 8, the controller 230 may display a UI screen 810 including a menu corresponding to a group preset by the user in the display 240. In response to a company menu 811 being selected by the user, the UI screen 820 including graphic objects 822, 823, and 824 representing a plurality of objects, which are predetermined with respect to the company menu 811 by the user, may be displayed in the display 240. In response to an all find menu 821 being selected, information for a wallet, a car key, and an access cared may be transmitted to the notification apparatuses. Accordingly, the user may pack all the objects to be needed before going to work.

An object which is previously possessed by the user may be included among the objects included in the group, and thus it is unnecessary to transmit the information for the object previously possessed by the user to the notification apparatuses. Accordingly, in an example embodiment, the object possessed by the user may be differently displayed from the object non-possessed by the user in the display 240.

For example, the controller 230 may determine a distance between the object and the user terminal apparatus 200 by wirelessly communicating with the object or the communication apparatus attached to the object through the communication unit 220. The controller 230 may control the display 240 to differently display an object within a preset distance to the user terminal apparatus 200 from an object out of the preset distance. In response to the wallet and the car key being located within the preset distance and the access card being not located within the preset distance, the controller 230 may display the graphic object 824 corresponding to the access card on the display 240 with a different design from other graphic objects 822 and 823. In response to the graphic object 824 corresponding to the access card being selected by the user, the controller 230 may transmit the information for the access card to the plurality of notification apparatuses or the representative notification apparatus through the communication unit 220.

In another example embodiment, the communication between the objects may possible and a graphic object for an object far away in a certain distance or more from a plurality of objects among the objects in the group may be differently displayed on the display 240 from graphic objects for the plurality of objects.

As described above, an object to be searched may be selected and information for the selected search target may be transmitted to the plurality of notification apparatuses or the representative notification apparatus. As described above, the notification apparatus closest to the object among the plurality of notification apparatuses may perform the notification operation and induce the user to a place in which the object is located.

Figure 9:
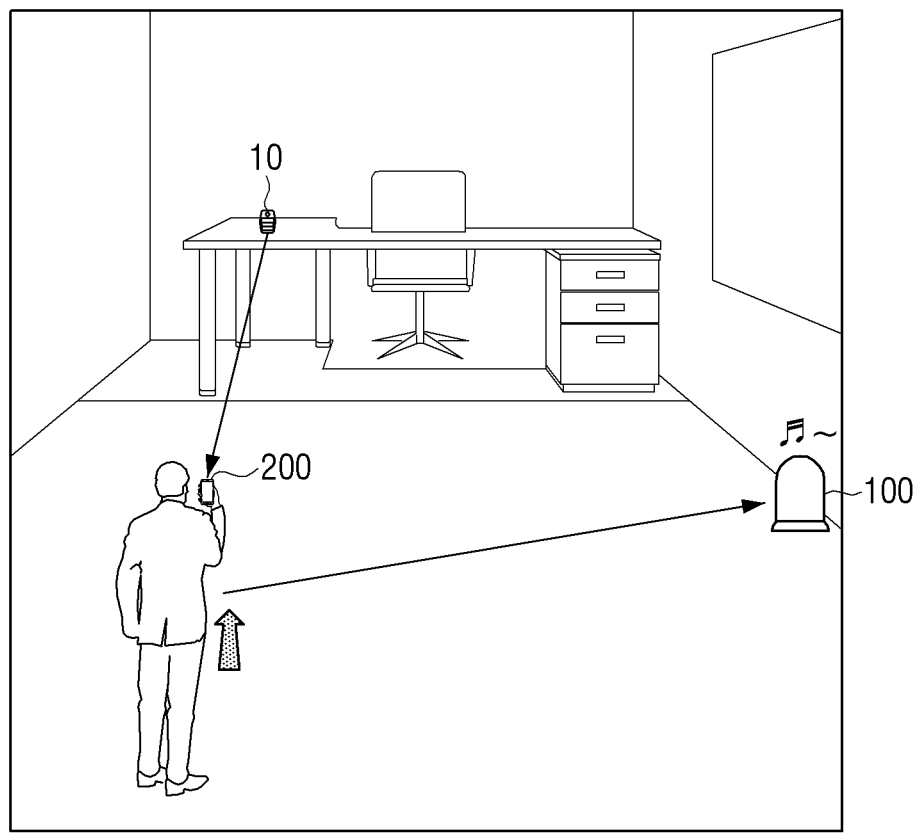
FIG. 9 is a diagram illustrating an example notification operation of an notification apparatus according to an example embodiment.

To induce the user to an accurate position of the object, the notification apparatus closest to the object may vary a notification level based on a distance between the user and the object. For example, as the distance between the user and the object is reduced, the notification apparatus may output a sound faster. The information for the distance between the user and the object may be transmitted from the user terminal apparatus 200 to the notification apparatus. FIG. 9 is a diagram illustrating an example notification operation of the notification apparatus in the example embodiment.

Referring to FIG. 9, an object 10 may broadcast a communication signal including its own unique information and the controller 230 may determine a distance between the object 10 and the user terminal apparatus 200 based on an intensity of the communication signal acquired from the object 10, for example, the car key. The controller 230 may control the communication unit 220 to transmit the information for the determined distance in real time to the notification apparatus 100. Based on the received information for the distance, the notification apparatus 100 may output the sound faster as the distance between the user terminal apparatus 200 and the object 10 is reduced and may output the sound more slowly as the distance between the user terminal apparatus 200 and the object 10 is increased. Accordingly, the user may be induced toward the object 10 based on the notification operation of the notification apparatus 100.

The user terminal apparatus 200 may directly control the notification operation of the notification apparatus. In response to a notification apparatus which may perform the notification operation being selected through the input unit 210, the controller 230 may control the communication unit 220 to transmit a notification execution command to the selected notification apparatus. The notification operation in the example embodiment may be useful for the blind. For example, the input unit 210 may include a microphone, and the user terminal apparatus 200 may recognize a voice input through the microphone. A notification apparatus corresponding to the recognized voice may be selected and the controller 230 may transmit the notification execution command to the selected notification apparatus. In response to "main room" being uttered by the user, the controller 230 may transmit the notification execution command to a notification apparatus located in the main room so that the notification apparatus corresponding to "main room" performs the notification operation.

Information for positions in which preregistered notification apparatuses are located may be pre-stored in the user terminal apparatus 200. For example, the user terminal apparatus 200 may determine the accurate position of the object by synthesizing the pre-stored information and the information for the distance between the notification apparatuses and the object. In this example, it may be necessary to receive the information for the distance between the notification apparatus and the object from the at least three or more notification apparatuses.

For example, in response to a target to be searched being input through the input unit 210, the controller 230 may transmit information for an object corresponding to the search target to the representative notification apparatus. Based on control of the representative notification apparatus, search results of all the notification apparatuses may be synthesized and the synthesized search result may be received through the communication unit 220.

The information for the positions of all the notification apparatuses and the information for the distances between all the notification apparatuses and the object are stored in the user terminal apparatus 200, and thus the controller 230 may determine the accurate position of the object using the information. It has been described that the user terminal apparatus 200 determines the accurate position of the object, but the representative notification apparatus other than the user terminal apparatus may determine the position of the object and notify the user terminal apparatus 200 of the determined position of the object.

In response to the accurate position of the object being determined, the controller 230 may provide the information for the position of the object to the user through various methods. For example, the controller 230 may control the display 240 of the user terminal apparatus 200 to display a map image indicating the position of the object.

In this example, it may be necessary to pre-store a map having information for positions of a plurality of notification apparatuses in the user terminal apparatus 200. The controller 230 may represent the determined positions of the objects with graphic objects on the pre-stored map. In the example embodiment, the user may easily find the object since the information for the position of the object is visually provided to the user.

Figure 10A:
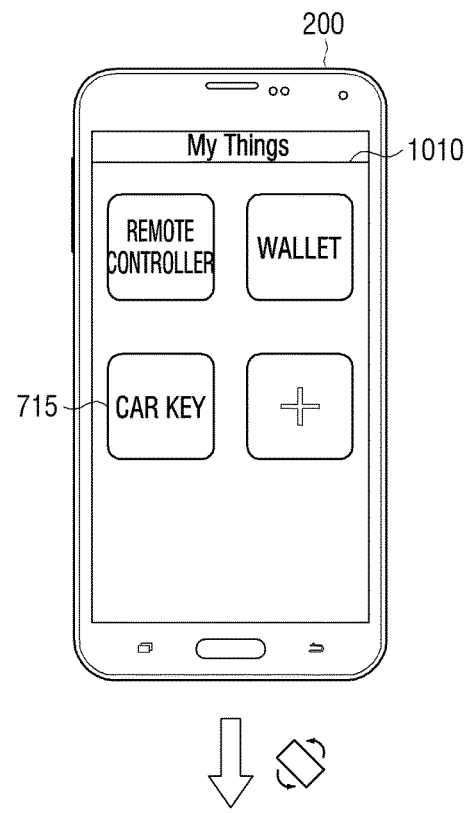
Figure 10B:
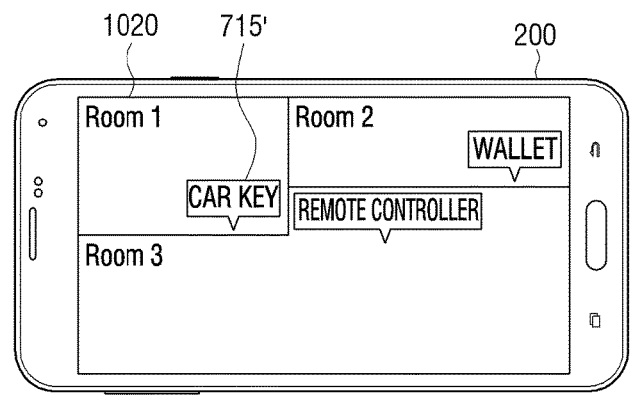

FIGS. 10A and 10B are diagrams illustrating an example screen displayed in the user terminal apparatus 200 according to an exemplary embodiment.

Referring to FIG. 10A, the user may select an object to be found through a UI screen displaying graphic objects of preregistered objects, and a position of the selected object may be displayed on a map 1020 (see FIG. 10B). In response to a graphic object 715 corresponding to a car key being selected by the user, a graphic object 715' indicating a place in which the car key is located may be displayed on the map 1020.

Only the position of the object selected by the user may be displayed on the map 1020 or the positions of all the registered objects may be displayed on the map 1020. For example, even in response to a specific control command being not received from the user terminal apparatus 200, the notification apparatuses may be set to regularly perform the search operation every fixed cycle and transmit the search result to the user terminal apparatus 200 every preset cycle. The user terminal apparatus 200 may provide the positions of all the preregistered objects to the user based on the received information.

In an example embodiment, the input unit 110 may include a sensor configured to detect a motion of the user terminal apparatus 200. As illustrated in FIG. 10A, in response to the user terminal apparatus 200 being in a first direction, the controller 230 may display the screen 1010 including a list for preregistered objects, and in response to the user terminal apparatus being in a second direction different from the first direction, the controller 230 may display the map 1020 indicating the preregistered objects. Accordingly, the user may determine the positions of the objects all the time.

Figure 11:
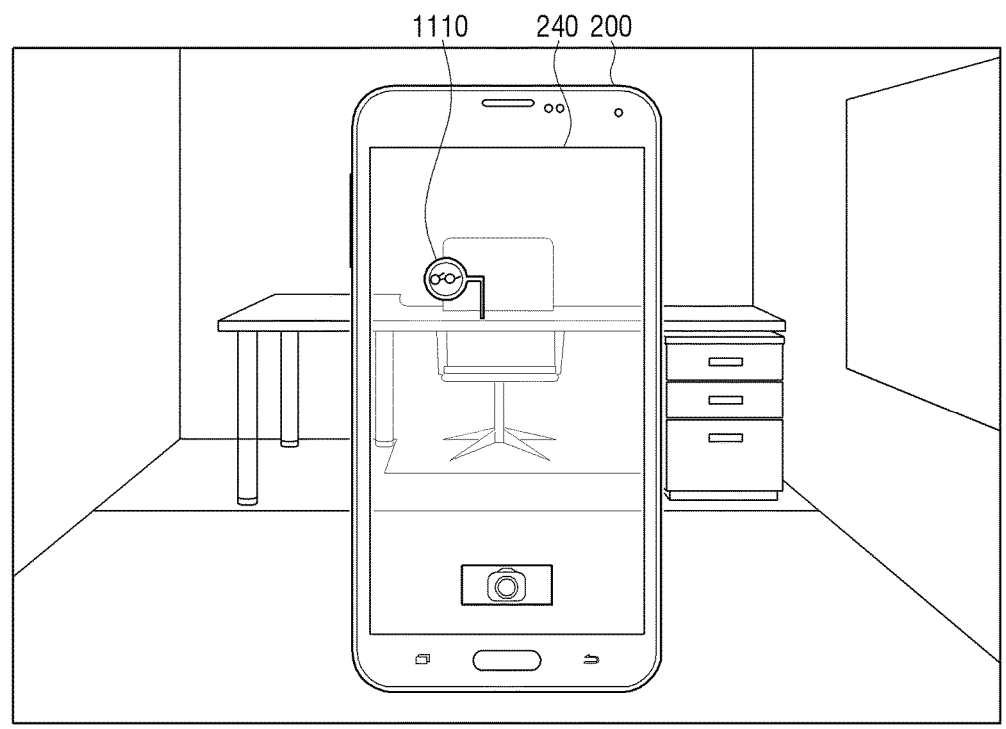

It has been described in the exemplary embodiment that the position of the object is displayed on the map, but information for the position of the object may be provided to the user through an augmented reality (AR) method in another example embodiment. FIG. 11 is a diagram illustrating an AR screen provided from the user terminal apparatus 200 according to an example embodiment.

Referring to FIG. 11, the user terminal apparatus 200 may include an imaging unit configured to generate an imaged image by imaging a subject, and the controller 240 may synthesize the information for the position of the object with the imaged image and display the synthesized result in the display 230. A graphic object 1110 indicating the position of the object to be found may be displayed on the imaged image. It can be seen from FIG. 11 that glasses to be found are located on the desk. In the example embodiment, the user may receive a guide for the position of the object while seeing an actual space, and thus the understanding degree of the user may be further increased.

The information for the position of the object may be displayed on the display 230 in a notification message form. A notification message may include information such as a map in which a name of the object, a room name in which the object is located, and a position of the object are displayed. For example, the text "The remote controller is located in the main room" may be displayed in the display 240.

In an example embodiment, the information for the movement of the object may also be provided to the user. For example, the notification apparatuses may search the object all the time and store the search result. In response to a request for the search result with respect to a specific period being received from the user terminal apparatus 200, the representative notification apparatus may transmit the search result to the user terminal apparatus 200 based on the request of the user terminal apparatus. Such an operation in the example embodiment will be described with reference to FIG. 12.

Figure 12:
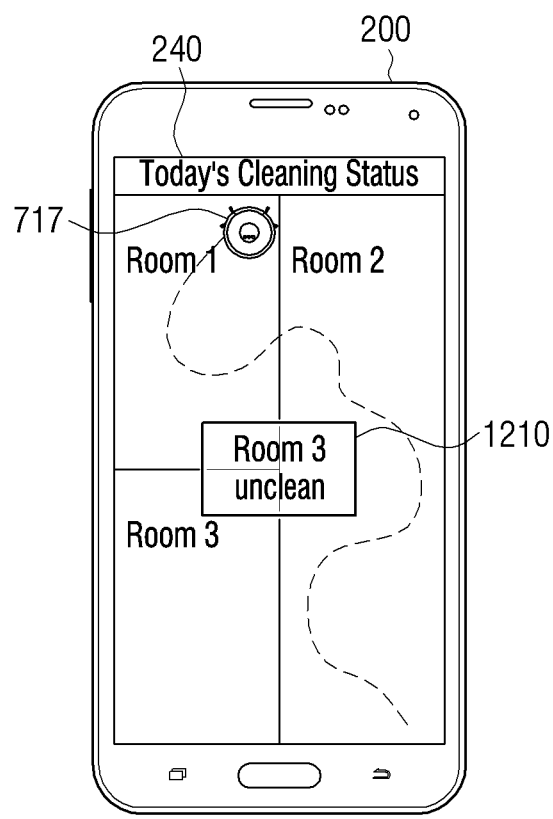

Referring to FIG. 12, for example, a first notification apparatus may be disposed in a Room 1, a second notification apparatus may be disposed in a Room 2, and a third notification apparatus may be disposed in a Room 3. In response to an object 717 being moved to the Room 2 via the Room 1 for a specific period, search results acquired through the first to third notification apparatuses may be transmitted to the user terminal apparatus 200. The controller 230 may determine on the basis of the search results that the object 717 is moved from the first notification apparatus not toward the third notification apparatus but toward the second notification apparatus for the specific period.

Since mapping data of the first notification apparatus and the Room 1, mapping data of the second notification apparatus and the Room 2, and mapping data of the third notification apparatus and the Room 3 are pre-stored in the user terminal apparatus 200, the controller 230 may display a screen including information indicating that the object 717 is moved from the Room 1 to the Room 2 for the specific period on the display 240. Information 1210 indicating that the object is not presented in the Room 3 for the specific period may also be displayed in the screen. In response to the object being a robot cleaner, the user may determine that the Room 3 is not cleaned.

Figure 13:
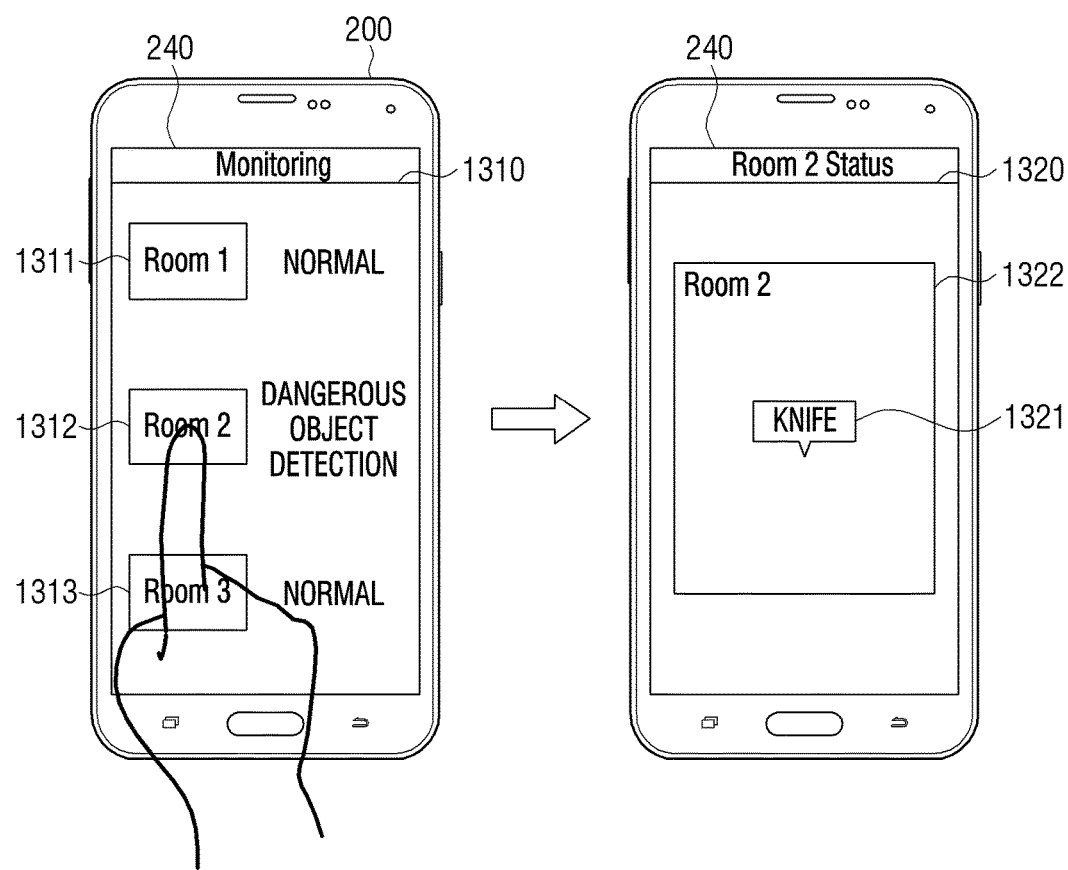
FIGS. 13 and 14 are diagrams illustrating example object monitoring functions of a user terminal apparatus according to various example embodiments.

FIG. 13 is a diagram illustrating an example monitoring function provided from the user terminal apparatus 200 according to an example embodiment.

Referring to FIG. 13, the user terminal apparatus 200 may provide a monitoring function based on search results received from a plurality of notification apparatuses. For example, information for a dangerous object preregistered by the user being pre-stored in the user terminal apparatus 200 and in response to the dangerous object being determined to be presented based on the search results received from the plurality of notification apparatuses, the controller 230 may provide a detection result for the dangerous object to the user.

In another example, in response to information for the dangerous object being pre-stored in each of the plurality of notification apparatuses and the dangerous object being searched, each of the plurality of notification apparatuses may notify the user terminal apparatus 200 of the search result for the dangerous object.

In the example embodiment, in response to the dangerous object being presented in a specific room, the detection result for the dangerous object may be provided through the display 240 of the user terminal apparatus 200. For example, it may be assumed that the Room 2 is a child's room and the user registers a knife as the dangerous object with respect to the Room 2. Even in response to a separate control command being not input from the outside, the notification apparatuses disposed in the Room 1, Room 2, and Room 3 may search neighboring objects all the time and may provide the search results to the user terminal apparatus 200. In response to the dangerous object being searched while the search operation on the neighboring objects is performed all the time, the plurality of notification apparatuses may provide the information for the dangerous objects to the user terminal apparatus 200.

In response to any dangerous object among the preregistered dangerous objects being included in the search results, the controller 230 may display the information for the dangerous object through the display 240 based on the search results received from the plurality of notification apparatuses and the information for the pre-stored dangerous objects. In response to information for a specific object and information indicating that the specific object is the dangerous object being transmitted to the user terminal apparatus 200 from the notification apparatus which searches the dangerous object, the controller 230 may display the information for the dangerous object through the display 240 based on the received information.

For example, as illustrated in FIG. 13, the display 240 may display a monitoring UI screen 1310. The monitoring UI screen 1310 may display rooms to be managed. In response to any one of graphic objects 1311, 1312, and 1313 corresponding to the rooms being selected, status information for the selected room may be displayed in the display 240. In response to the information for the dangerous object being received from the notification apparatus disposed in the Room 2, the controller 230 may display a dangerous object detection message as illustrated in FIG. 13. In response to the graphic object 1312 of the Room 2 being selected by the user, the controller 230 may control the display 240 to display a status UI screen 1320 of the Room 2. The status UI screen 1320 of the Room 2 may include a map image 1322 of the Room 2, and a graphic object 1321 indicating a position of a knife as the dangerous object may be displayed. The user may go to the Room 2 and remove the knife as the dangerous object with reference to the map image 1322. The notification apparatus according to the exemplary embodiment may prevent the dangerous object from being presented in the child's room.

In another example embodiment, the user terminal apparatus 200 may provide a monitoring camera image to the user through the notification apparatus. Such an operation in the example embodiment will be described below with reference to FIG. 14.

Figure 14:
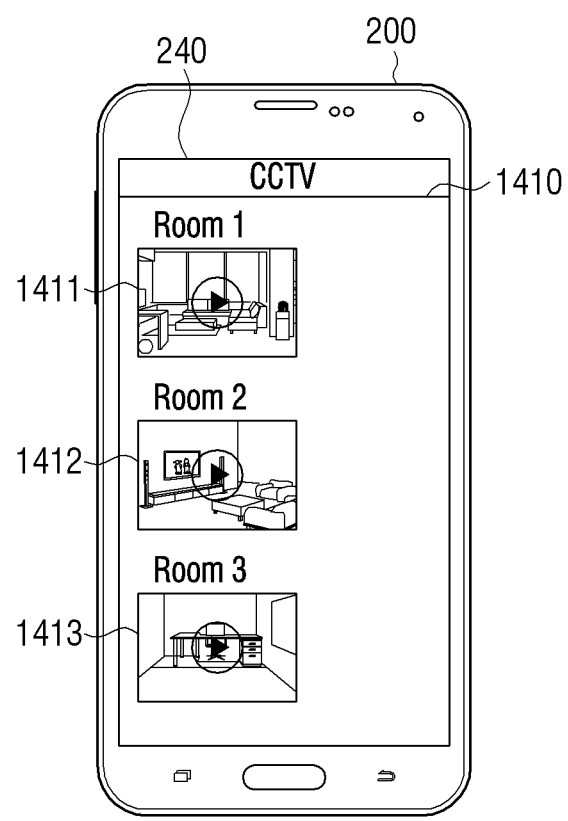

The notification apparatus disposed in each room may include a closed-circuit television (CCTV) and record a situation of the room. The user terminal apparatus 200 may acquire CCTV images from the notification apparatuses and display a UI screen 1410 which provides the CTV images as illustrated in FIG. 14. The user may select any one of graphic objects 1411, 1412, and 1413 corresponding to the notification apparatuses disposed in the rooms and may determine a real-time CCTV image, a past CCTV image, and the like.

In an example embodiment, the user terminal apparatus 200 may notify the user of absence of an object to be found based on the search results of the plurality of notification apparatuses in response to the objet being absent. For example, a message indicating that the object is absent may be displayed in the display 240.

In response to the object to be found being absent in home in which the notification apparatus is disposed, one of the family numbers may go out with the object, and thus the user terminal apparatus 200 may inquire presence of the object of user terminal apparatuses of other users. Such an operation in the example embodiment will be described below with reference to FIG. 15.

Figure 15:
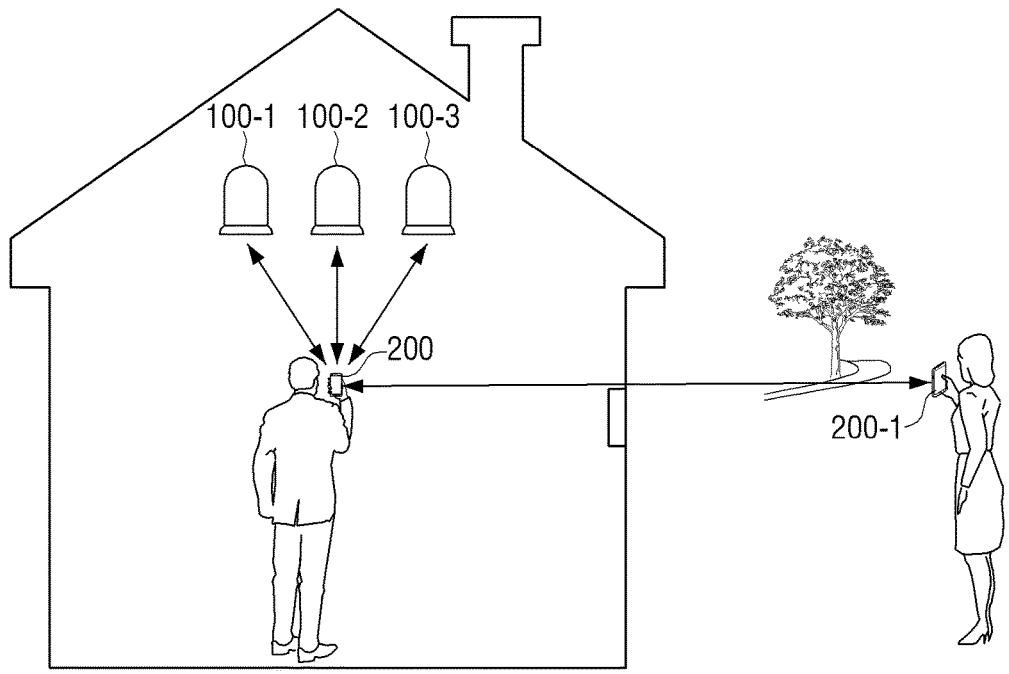
FIG. 15 is a diagram illustrating an example external object search method of a user terminal apparatus according to an example embodiment.

FIG. 15 is a diagram illustrating an example object information exchange between the user terminal apparatus 200 and another user terminal apparatus 200-1 according to an example embodiment.

Referring to FIG. 15, in response to the object to be found being determined to be absent in home by the user terminal apparatus 200 through communication with a plurality of notification apparatuses 100-1, 100-2, and 100-3, the controller 230 of the user terminal apparatus 200 may transmit information for the corresponding object to the other user terminal apparatus 200-1 which is preregistered. The other user terminal apparatus 200-1 may also be an apparatus which can communicates with the object like the above-described user terminal apparatus 200, and thus the other user terminal apparatus 200-1 may search for whether or not the corresponding object is located in the periphery through a wireless communication method according to a request of the user terminal apparatus 200. The other user terminal apparatus 200-1 may transmit the search result to the user terminal apparatus 200.

In another example, the other user terminal apparatus 200-1 may search an object in home using the user terminal apparatus 200 in home. In another example, the other user terminal apparatus 200-1 may search the object in home by communicating with the representative notification apparatus in home.

It has been described in the above-described example embodiments that the representative notification apparatus is configured to be separated from the user terminal apparatus 200, but the user terminal apparatus 200 may be implemented to perform a function of the representative notification apparatus. For example, the user terminal apparatus 200 may transmit a search command to a plurality of notification apparatuses, request a notification apparatus, which may not transmit a search result for a preset time after the transmission of the search result, to transmit the search result again, control a notification apparatus closest to the search target object to perform notification operation, and control all the plurality of notification apparatuses to perform the notification operation in response to the proximity of the plurality of notification apparatuses with respect to the object being the same as each other. In this example, the user terminal apparatus 200 may serve to perform the overall control of the notification apparatuses other than the notification operation.

Figure 16:
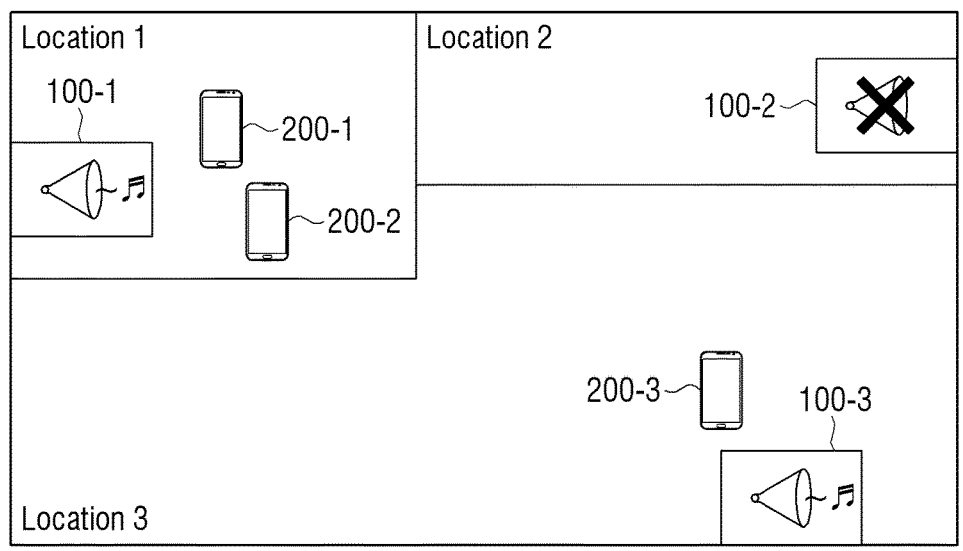
FIG. 16 is a diagram illustrating an example music service providing method of a notification apparatus according to an example embodiment.

FIG. 16 is a diagram illustrating an example music service providing method using a notification apparatus according to an example embodiment.

A plurality of notification apparatuses 100-1, 100-2, and 100-3 may be apparatuses which may output a sound under the control of an external apparatus as described above. The plurality of notification apparatuses 100-1, 100-2, and 100-3 may receive information for music from a user terminal apparatus located within a communicable range by communicating with the user terminal apparatus. The plurality of notification apparatuses 100-1, 100-2, and 100-3 may autonomously store a music database therein or may download music from an external server.

A plurality of user terminal apparatuses 200-1, 200-2, and 200-3 may store the information for the music. The information of the music may refer to information for music to which the user listens through the user terminal apparatus or information for music to which the user's music taste is reflected such as information for music stored in the user terminal apparatus. The plurality of user terminal apparatuses 200-1, 200-2, and 200-3 may transmit the information for the music to a notification apparatus located within a communication range among the plurality of notification apparatuses 100-1, 100-2, and 100-3.

For example, as illustrated in FIG. 16, a first notification apparatus 100-1 may be connected to a first user terminal apparatus 200-1 and a second user terminal apparatus 200-2 in a wireless communication manner. The first notification apparatus 100-1 may receive the information for the music from the first user terminal apparatus 200-1 and the second user terminal apparatus 200-2 and output music common to the first and second user terminal apparatuses 200-1 and 200-2. In this example, the first notification apparatus 100-1 may output the favorite music of the user of the first user terminal apparatus 200-1 and the user of the user terminal apparatus 200-2 in common.

Similarly, a third notification apparatus 100-3 may be connected to a third user terminal apparatus 200-3 in a wireless communication manner and output corresponding music by receiving the information for the music from the third user terminal apparatus 200-3. For example, the third notification apparatus 100-3 may output the music matching the user's taste of the third user terminal apparatus 200-3.

Since any user terminal apparatus communicable with the second notification apparatus 100-2 is not presented around the second notification apparatus 100-2, the second notification apparatus 100-2 may not output music. Accordingly, power waste according to the music output may be prevented and/or reduced. For example, the system being applied to a place such as a large indoor park, the power loss according to the music output all the time in a place in which no person exists may be reduced.

The various example embodiments described herein may be implemented within a recoding medium readable by a computer or an apparatus similar to the computer using software, hardware, or a combination thereof. In the hardware implementation, the example embodiments described herein may be implemented using at least one among ASCIs, DSPs, DSPDs, PLDs, FPGAs, processors (e.g., including CPUs), controllers, micro-controllers, microprocessors, and electrical units for performing other functions. In some examples, the example embodiments described herein may be implemented with the controller 230 itself. In the software implementation, the example embodiments such as a procedure and a function described herein may be implemented with separate software modules. Each of the software modules may perform one or more functions and operations described herein.

Figure 17:
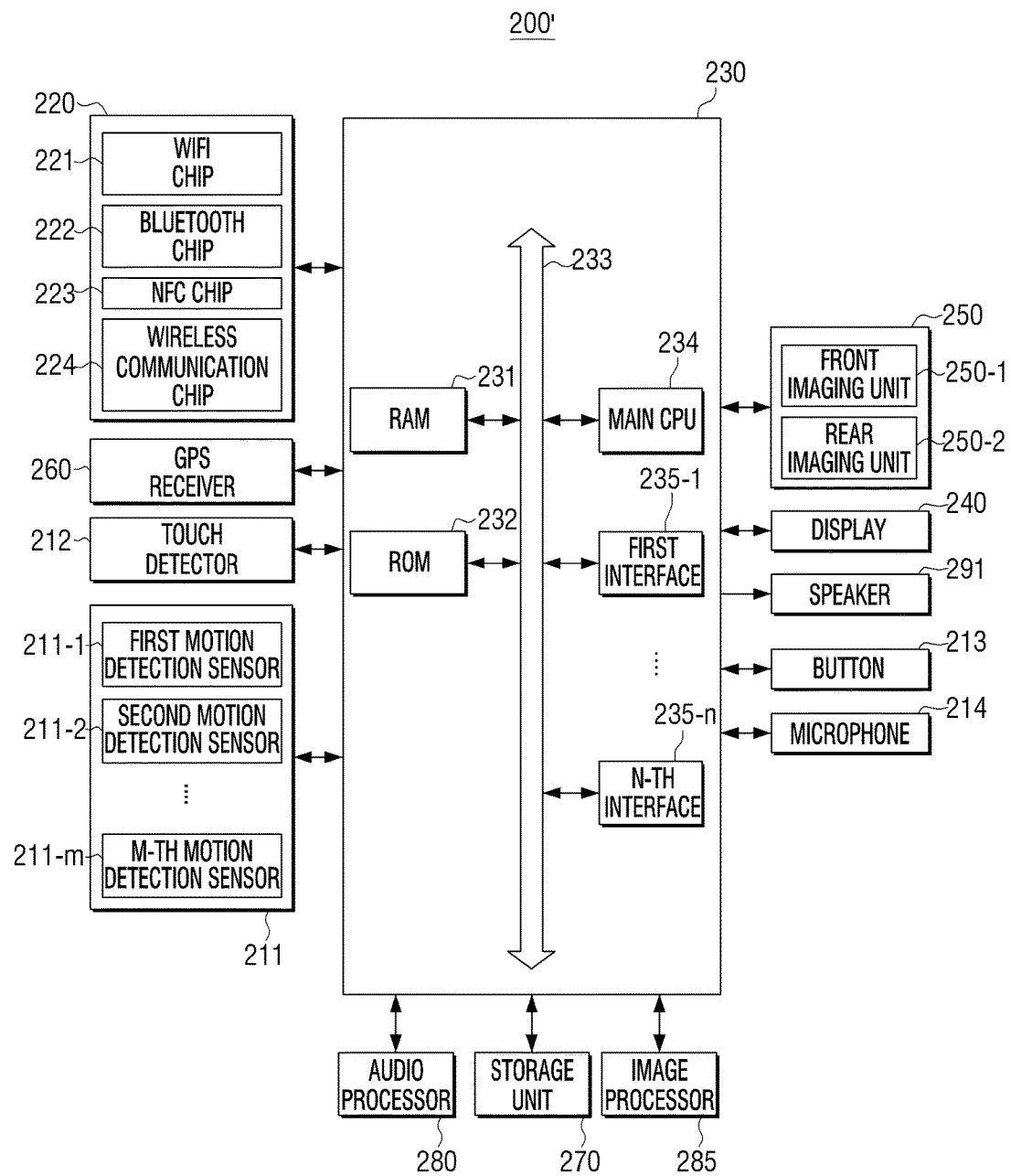
FIG. 17 is a block diagram illustrating an example user terminal apparatus according to another example embodiment.

FIG. 17 is a block diagram illustrating an example configuration of a user terminal apparatus 200' according to another example embodiment. Detailed description for a portion of the user terminal apparatus 200' overlapping the configuration of the user terminal apparatus 200 in FIG. 6 will be omitted.

Referring to FIG. 17, the user terminal apparatus 200' may include a display 240, an imaging unit (e.g., including imaging circuitry) 250, a controller 230, a detector 211, a touch detector 212, a communication unit (e.g., including communication circuitry) 220, a global positioning system (GPS) receiver 260, a storage unit 270, an audio processor 280, an image processor 285, a speaker 291, a button 213, and a microphone 214.

The display 240 may be configured to display various graphic objects according to control of the controller 230. For example, the display 240 may be implemented with a liquid crystal display (LCD). In some examples, the display 240 may be implemented with a cathode-ray tube (CRT), a plasma display panel (PDP), an organic light emitting diode (OLED), and the like. The display 240 may be implemented in a touch screen form which may detect a touch operation of the user.

The imaging unit 250 may include circuitry configured to image a still image or a moving image according to control of the user. The imaging unit 250 may include a front imaging unit 250-1 and a rear imaging unit 250-2. The front imaging unit 250-1 may be disposed in a user direction, that is, a display direction on the basis of the display 240, and the rear imaging unit 250-2 may be disposed in an opposite direction to the display direction. The imaging unit 250 may image a subject, and the controller 230 may generate the above-described AR image by synthesizing information for a position of an object with the imaged image.

The detector 211 may include a plurality of motion detection sensors 211-1 to 211-m.

The plurality of motion detection sensors 211-1 to 211-m may be sensors configured to detect a rotation state of the user terminal apparatus 200', a position of the user, and the like. A geomagnetic sensor, an acceleration sensor, a gyro sensor, and the like may be used as the sensor configured to detect the rotation state. The acceleration sensor may output a sensing value corresponding to gravity acceleration which is varied according to a slope of the sensor-attached apparatus. The gyro sensor may be a sensor configured to detect angular velocity by measuring Coriolis force acting to a velocity direction in a rotational motion. The geomagnetic sensor may be a sensor configured to detect an azimuth angle. An image sensor, an infrared sensor, an ultrasonic sensor, or a proximity sensor may be used as the sensor configured to detect the position of the user.

The touch detector 212 may detect a touch operation of the user or a pen. The touch detector 212 may include a touch sensor, and the touch sensor may be implemented in a capacitive type or a resistive type. The capacitive type touch sensor may determine a touch coordinate by detecting micro electricity induced to a body of the user using a dielectric coated on a layer surface of the display in response to a portion of the body of the user being touched on the layer surface of the display. The resistive type touch sensor may include two electrode plates and determine a touch coordinate by detecting a current flowing through contact of upper and lower electrode plates at a touched point in response to the point of the screen being touched by the user. Such a touch sensor may be implemented in various types.

In response to a coil being included in the inside of the pen used as an input unit, the touch detector 212 may include a magnetic field sensor configured to detect a magnetic field varied according to the coil in the inside of the pen. Accordingly, the touch detector 212 may detect a touch operation as well as a proximity operation, e.g., hovering.

The touch detector 212 my receive selection for the search target object from the user, receive a user operation for zoom-in or zoom-out of a graphic object displayed in the display 240, and receive handwriting by the user or the pen.

The controller 230 may determine a touch operation type based on a detection signal detected through the touch sensor of the touch detector 212. The touch operation may include various operations such as simple touch, tap, touch and hold, move, flick, drag and drop, pinch-in or pinch-out. The controller 230 may control the configuration of the user terminal apparatus 200' according to the user touch detected through the touch detector 212.

The button 213 may include various types of buttons such as a mechanical button, a touch pad, or a wheel which are formed in arbitrary regions (for example, a front, a side, a rear, and the like) of an outer appearance of a main body of the user terminal apparatus 200'. The button 213 may receive the selection for the search target object from the user.

The microphone 214 may be configured to receive a user voice or other sounds and convert the received voice or sounds to audio data. The controller 230 may use the user voice input through the microphone 214 in the video call process or convert the user voice to the audio data and store the audio data in the storage unit 270. The controller 230 may recognize the user voice input through the microphone 214 and perform a control operation according to the user voice. For example, the controller 230 may control the communication unit 220 to transmit a notification execution command to a notification apparatus corresponding to the recognized user voice.

The detector 211, the touch detector 212, the button 213, and the microphone 214 may serve as the above-described input unit 210.

The controller 230 may display various screens in the display 240 by controlling the user terminal apparatus 200' according to detection results detected through the touch detector 212 and the plurality of motion detection sensors 211-1 to 211-m, an operation state of the button 213, a motion gesture of the user acquired using the imaging unit 250, a voice command acquired using the microphone 214, and the like.

The controller 230 may perform a control operation according to the user voice input through the microphone 214 or a user motion recognized through the imaging unit 250. For example, the user terminal apparatus 200' may be operated in a motion control mode or a voice control mode in addition to a general mode controlled by a touch or a button operation of the user. In response to the user terminal apparatus 200' being operated in the motion control mode, the controller 230 may image the user by activating the imaging unit 250, trace change in a motion of the user, and perform a control operation corresponding to the change in the motion of the user. In response to the user terminal apparatus 200' being operated in the voice control mode, the controller 230 may be operated in the voice recognition mode which analyzes a user voice input through the microphone 214 and perform a control operation according to the analyzed user voice.

The storage unit 270 may store programs such as an operating system (O/S) or various applications, or various data such as user setup data, data generated in an application execution process, and multimedia content.

The storage unit 270 may pre-store information for a registered object, information for a position of the registered object, information for motion history of the registered object, and the like. The storage unit 270 may pre-store information for a registered notification apparatus, information for a position of the registered notification apparatus, a map for a place in which the notification apparatus is disposed, and the like. The storage unit 270 may pre-store information for history that user found the object, the storage unit 270 may pre-store a variety of multimedia content such as music, a photo, and a moving image, and the storage unit 270 may pre-store information such as the user's music favorite.

The controller 230 may perform communication with external apparatuses through the communication unit 220.

The communication unit 220 may include various communication circuitry configured to perform communication with various types of external apparatuses according to various types of communication methods. The communication unit 220 may include various communication circuitry including, for example, chips such as a WIFI chip 221, a Bluetooth chip 222, a NFC chip 223, and a wireless communication chip 224.

The WIFI chip 221, the Bluetooth chip 222, and the NFC chip 223 may perform communication in a WIFI manner, a Bluetooth manner, and an NFC manner, respectively. Among the communication chips, the NFC chip 223 may be a chip configured to operate in the NFC manner using a band of 13.56 MHz among RF-ID frequency bands such as 135 kHz, 13.56 MHz, 433 MHz, 860 to 960 MHz, and 2.45 GHz. In response to the WIFI chip 221 or the Bluetooth chip 222 being used, the communication unit 220 may first transmit/receive a variety of connection information such as an SSID and a session key, perform communication connection using the connection information, and transmit/receive a variety of information. The wireless communication chip 224 may be a chip configured to perform communication according to various communication standards, such as IEEE, Zigbee, 3G, 3GPP, or LTE. The controller 230 may display data received from the external apparatus through the communication unit 220 in the display 240.

The GPS receiver 260 may be configured to calculate a current position of the user terminal apparatus 200' by receiving a GPS signal from a GPS satellite. In response to a map function being executed, the controller 230 may calculate the current position using the GPS signal received through the GPS receiver 260 and display an object search guide screen to which the current position is reflected in the display 240.

The image processor 285 may include a screen displayed in the display 240 as described above. The image processor 285 may include various circuitry components such as a codec configured to perform encoding or decoding on video data, a parser, a scaler, a noise filter, or a frame rate conversion module.

The audio processor 280 may be configured to perform processing on audio data. The audio processor 280 may perform various processing such as decoding, amplification, noise filtering, and the like on the audio data. In response to content including an audio signal being reproduced, the controller 230 may control the audio processor 280 to output the audio signal. The audio signal may be provided to the speaker 291 and output through the speaker 291.

The speaker 291 may be configured to output various notification sounds and voice messages as well as a variety of audio data processed in an audio processor 280.

The user terminal apparatus 200' may further include various external input ports for coupling to various external terminals such as a headset, a mouse, and a LAN.

The above-described operation of the controller 230 may be accomplished through program stored in the storage unit 270. The storage unit 270 may store O/S software for driving the user terminal apparatus 200' various applications, a variety of data input or set during application execution, content, a touch gesture, a motion gesture, a voice command, event information, and the like.

The controller 230 may control an overall operation of the user terminal apparatus 200' using various programs stored in the storage unit 270.

The controller 230 may include a random access memory (RAM) 231, a read only memory (ROM) 232, a main CPU 234, first to n-th interfaces 235-1 to 235-n, and a bus 233. The RAM 231, the ROM 232, the main CPU 234, the first to n-th interfaces 235-1 to 235-n, and the like may be electrically coupled through the bus 233.

The first to n-th interfaces 235-1 to 235-n may be coupled to the above-described components. One of the interfaces may be a network interface coupled to an external apparatus through a network.

The main CPU 234 accesses the storage unit 270 to perform booting using the O/S stored in the storage unit 270. The main CPU 234 may perform various operations using a variety of programs, content, data, and the like stored in the storage unit 270.

A command set and the like for system booting may be stored in the ROM 232. In response to a turn-on command being input to supply power, the main CPU 234 may copy the O/S stored in the storage unit 270 to the RAM 231 according to a command stored in the ROM 232, and execute the O/S to boot a system. In response to the booting being completed, the main CPU 234 may copy various application programs stored in the storage unit 270 to the RAM 231, and execute the application programs copied to the RAM 231 to perform various operations.

In response to various types of user operations being detected through the touch detector 212, the plurality of motion detection sensors 211-1 to 211-m, the button 213, the imaging unit 250, the microphone 214, and the like, the main CPU 234 may determine whether or not an event matching event information stored in the storage unit 270 is generated using a detected result. The event may be variously set. For example, the event may include an event in which a user touch or button selection is accomplished, an event in which a motion gesture, a voice command, and the like are input, an event in which an application execution command is input, an event in which a content reproduction command is input, an event in which a preset set time or period arrives, an event in which a system alarm message is generated, an event in which communication with an external source is accomplished, and the like.

Although not shown in FIG. 17, in some example embodiments, the user terminal apparatus 200' may further include various external input ports for coupling to various external terminals such as a universal serial bus (USB) port to which a USB connector may be couple, a headset, a mouse, and a LAN, a digital multimedia broadcasting (DMB) chip which receives a DMB signal and process the received DMB signal, various sensors, and the like therein. The user terminal apparatus 200' may include a vibration generator configured to perform the notification operation by generating vibration like a general portable phone. The user terminal apparatus 200' may be operated as the representative notification apparatus as described above, and thus the above-described function of the configuration in FIG. 17 within the function overlapping between the user terminal apparatus 200' and the notification apparatus 100 may be applied to the notification apparatus 100.

Figure 18:
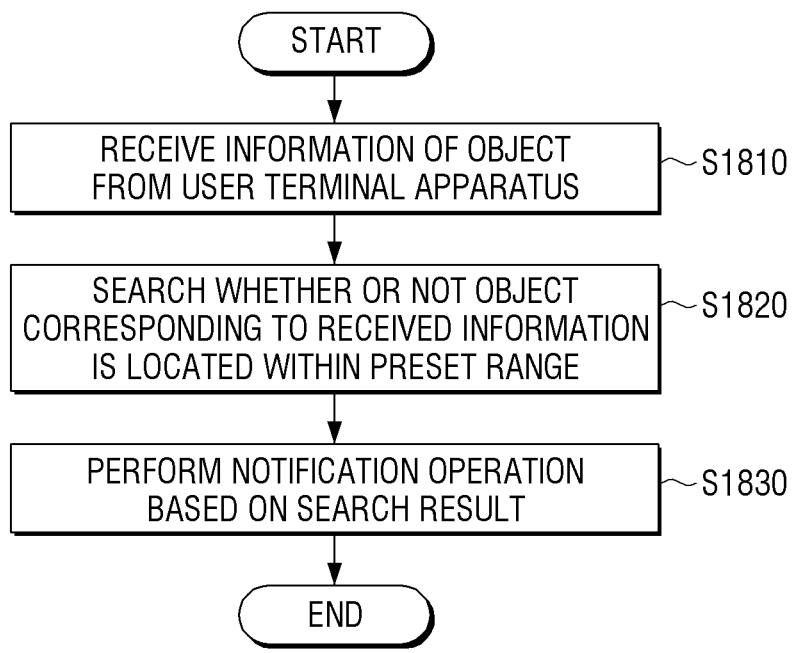

FIG. 18 is a flowchart illustrating an example object position notification method of a notification apparatus according to an example embodiment.

Referring to FIG. 18, first, the notification apparatus 100 may receive information of an object from a user terminal apparatus (S1810). The information of the object may include unique information for at least one among objects preregistered in the notification apparatus 100 and a search command for the corresponding object.

The notification apparatus 100 may search for whether or not an object corresponding to the information received from the user terminal apparatus is located within a preset range through a preset wireless communication method (S1820). The search may include an identification information request to the object or identification information reception of the object transmitted from the object.

In another example embodiment, the notification apparatus 100 may receive a search result for the object from another notification apparatus. The other notification apparatus may be an apparatus which receives information for the object from the user terminal apparatus like the notification apparatus 100. The notification apparatus 100 may request transmission of the search result for the object to the other notification apparatus. For example, the notification apparatus 100 may transmit the information for the object received from the user terminal apparatus to the other notification apparatus and receive the search result for the object from the other notification apparatus.

In response to the search result being not received from the outside within a preset time after the information for the object is received from the user terminal apparatus, the notification apparatus 100 may request the search result for the object to another notification apparatus which is preregistered.

The notification apparatus 100 may perform a notification operation based on the search result searched by the notification apparatus 100 (S1830).

The search result received from the other notification apparatus may be considered to perform the notification operation. For example, in response to the notification apparatus 100 being determined to be closer to the object than the other notification apparatus, the notification apparatus 100 may perform the notification operation. In another example, in response to the other notification apparatus being determined to be closer to the object than the notification apparatus 100, the notification apparatus 100 may be controlled not to perform the notification operation. In this example, the notification apparatus 100 may transmit a notification execution command to the other notification apparatus.

In addition to the above-described operations, the object position notification method of the notification apparatus in the example embodiment may further include the operations performed in the various example embodiments described in FIGS. 1 to 17, and thus detailed description thereof within an overlapping range in the example embodiments will be omitted.

The object position notification methods according to the above-described various example embodiments may be implemented with a program including an executable algorithm which may be executed in a computer, and the program may be stored in a non-transitory computer-readable medium and provided. The non-transitory computer-readable medium may be installed in various apparatuses and used.

According to the object position notification methods according to the various example embodiments, the user may easily find the position of the object and may suitably handle a situation by determining a current state of the object.

Figure 19:
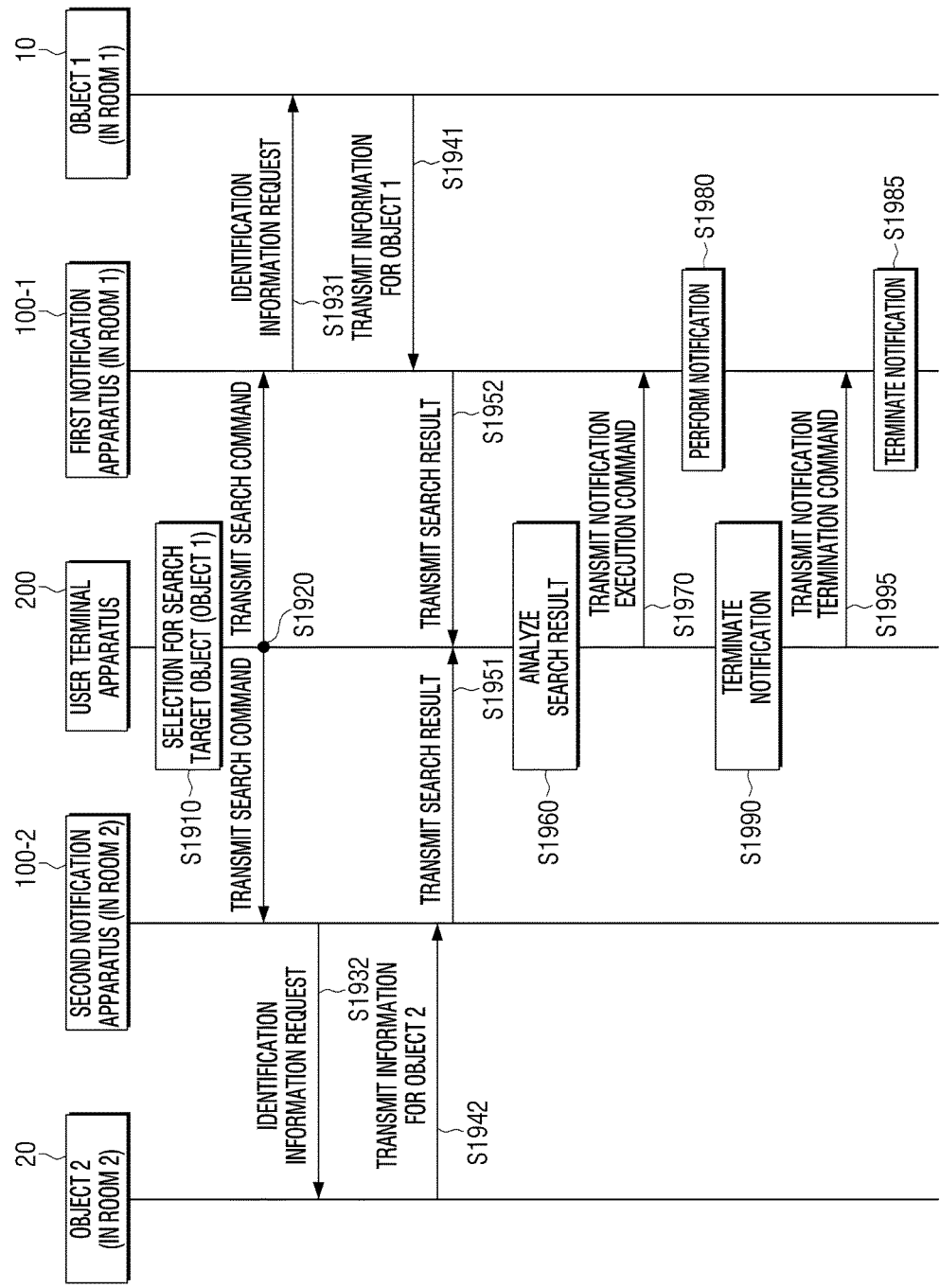

FIG. 19 is a sequence diagram illustrating an example operation of an object search system according to an example embodiment.

Referring to FIG. 19, first, the user terminal apparatus 200 may receive selection for a search target object from the user (S1910). The user terminal apparatus 200 may transmit a search command to a preregistered notification apparatus, that is, the first notification apparatus 100-1 and the second notification apparatus 100-2 (S1920).

The first notification apparatus 100-1 and the second notification apparatus 100-2 which receive the search command may transmit an identification information request to neighboring objects (S1931 and S1932). The objects which receive the identification information request, that is, an object 1 10 and an object 2 20 may transmit identification information (S1941 and S1942).

The first notification apparatus 100-1 and the second notification apparatus 100-2 may transmit search results including the identification information received from the objects to the user terminal apparatus 200 (S1951 and S1952). The user terminal apparatus 200 may determine whether or not the object 1 10 selected as the search target object is presented by synthesizing and analyzing the search results received from the first notification apparatus 100-1 and the second notification apparatus 100-2 (S1960). For example, in the example embodiment, the user terminal apparatus 200 other than the representative notification apparatus may perform the overall control of the notification apparatuses based on the search results.

The user terminal apparatus 200 may transmit a notification execution command to a notification apparatus which transmits the search result including the information for the object 1, that is, the first notification apparatus 100-1 (S1970). The first notification apparatus 100-1 may perform the notification operation based on the notification execution command received from the user terminal apparatus 200

(S1980). For example, the first notification apparatus 100-1 may perform the notification operation by outputting a sound.

In response to a notification termination event being generated (S1990), the user terminal apparatus 200 may transmit a notification termination command to the first notification apparatus 100-1 which is performing the notification operation (S1995). The notification termination event may include various events. For example, the notification termination event may be an event which inputs a command for stopping the notification of the first notification apparatus 100-1 through the user terminal apparatus 200 by the user. In another example, in response to the user terminal apparatus 200 being approaching a range that the user terminal apparatus 200 is directly communicable with the object 1 10, the user terminal apparatus 200 may determine a distance between the user terminal apparatus 200 and the object 1 10 based on an communication signal intensity acquired from the object 1 10. In response to the determined distance being less than a preset distance, the notification termination event may be an event that the determined distance is less than the preset distance. This is because it is regarded that the user finds the object 1 10 in response to the user terminal apparatus 200 being considerably close to the object 1 10.

The first notification apparatus 100-1 which receives the notification termination command may terminate the notification (S1985).

In another example embodiment, the user terminal apparatus 200 may specifically control the notification operation of the notification apparatus. Detailed control of the notification operation in the example embodiment will be described below with reference to FIG. 20.

Figure 20:
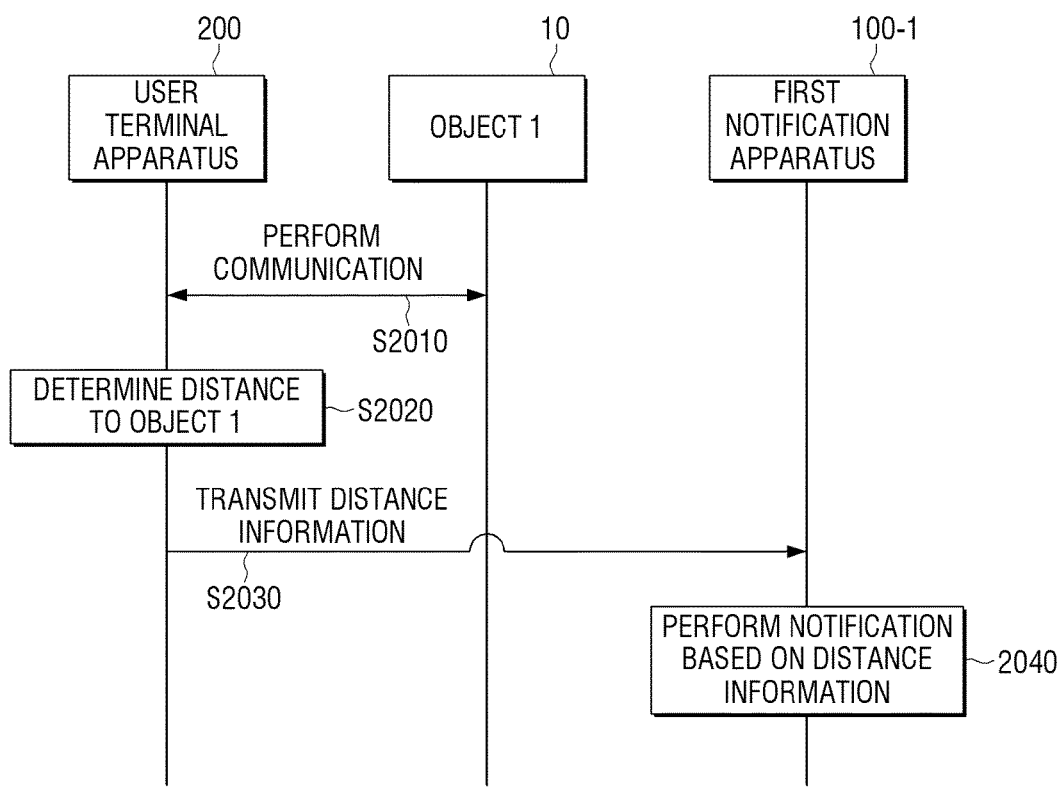

FIG. 20 is a sequence diagram illustrating an example operation to be performed before the notification termination event is generated as an extension of the scenario of FIG. 19.

The user carrying the user terminal apparatus 200 may be induced toward a place in which the object 1 10 is located through the notification operation of the first notification apparatus 100-1. In response to the distance between the object 1 10 and the user terminal apparatus 200 being reduced, the object 1 10 and the user terminal apparatus 200 may be in a communicable state with each other. For example, the communication between the object 1 10 and the user terminal apparatus 200 may be performed, the user terminal apparatus 200 may request the identification information to the object 1 10, and the object 1 10 may transmit its own unique information to the user terminal apparatus 200 (S2010).

The user terminal apparatus 200 may determine the distance to the object 1 10 based on the reception signal strength indication (RSSI) acquired from the object 1 10 (S2020). The user terminal apparatus 200 may transmit information for the determined distance to the first notification apparatus 100-1 (S2030). For example, the user terminal apparatus 200 may transmit the information for the determined distance in real time to the first notification apparatus 100-1.

The first notification apparatus 100-1 may perform the notification operation based on the information for the distance received in real time (S2040). For example, in response to the first notification apparatus 100-1 being an apparatus which perform the notification operation by outputting a sound and the distance between the user terminal apparatus 200 and the object 1 10 being determined to be increasingly reduced, the first notification apparatus 100-1 may perform the notification operation in such a manner that as the user terminal apparatus 200 is close to the object 1 10, the sound is fast output by increasing the output speed of the sound. In another example, in response to the distance between the user terminal apparatus 200 and the object 1 10 being determined to be increased, the first notification apparatus 100-1 may perform the notification operation in such a manner that as the user terminal apparatus 200 is far away from the object 1 10, the sound is slowly output by reducing the output speed of the sound. In another example, the distance between the user terminal apparatus 100-1 and the object 1 10 being determined to be less than the preset distance, the first notification apparatus 100-1 may consider that the user finds the object 1 10 and terminate the notification operation.

FIG. 21 is a sequence diagram illustrating an example operation of searching a plurality of objects at once according to another example embodiment.

Referring to FIG. 21, groups in which a plurality of objects are grouped by the user may be pre-stored in the user terminal apparatus 200. It may be assumed that the object 1 10 and the object 2 20 are included in a group 1. The user terminal apparatus 200 may receive selection for the group 1 including a plurality of objects to be searched from the user (S2110). The user terminal apparatus 200 may transmit a search command to a preregistered notification apparatus, thus, the first notification apparatus 100-1 and the second notification apparatus 100-2 (S2120).

The first notification apparatus 100-1 and the second notification apparatus 100-2 which receive the search command may transmit an identification information request to neighboring objects (S2131 and S2132). The objects which receive the identification information request, that is, the object 1 10 and the object 2 20 may transmit identification information (S2141 and S2142).

The first notification apparatus 100-1 and the second notification apparatus 100-2 may transmit search results including the identification information received from the objects to the user terminal apparatus 200 (S2151 and S2152). The user terminal apparatus 200 may determine whether or not the object 10 selected as the search target object is presented by synthesizing and analyzing the search results received from the first notification apparatus 100-1 and the second notification apparatus 100-2 (S2160). For example, in the exemplary embodiment, the user terminal apparatus 200 other than the representative notification apparatus may perform the overall control of the notification apparatuses based on the search results.

The user terminal apparatus 200 may transmit a notification execution command to a notification apparatus which transmits the search result including the information for the object 1 and the object 2 20 included in the group 1, that is, the first notification apparatus 100-1 and the second notification apparatus 100-2 on the basis of the analysis. For example, the first notification apparatus 100-1 and the second notification apparatus 100-2 may simultaneously perform the notification operation. In another example, for clarity, the first notification apparatus 100-1 and the second notification apparatus 100-2 may be controlled to sequentially perform the notification operation.

In this example, the user terminal apparatus 200 may first transmit the notification execution command to the first notification apparatus 100-1 (S2171). The first notification apparatus 100-1 may perform the notification operation according to the notification execution command received from the user terminal apparatus 200 (S2180). For example, the notification apparatus 100-1 may perform the notification operation by outputting a sound.

In response to a notification termination event of the first notification apparatus being generated (S2191), the user terminal apparatus 200 may transmit a notification termination command to the first notification apparatus 100-1 which is performing the notification operation (S2192), and transmit the notification execution command to the second notification apparatus 100-2 (S2172). The first notification apparatus 100-1 which receives the notification termination command may terminate the notification operation (S2183). The second notification apparatus 100-2 may perform the notification operation according to the notification execution command received from the user terminal apparatus 200 (S2185). For example, the second notification apparatus 100-2 may perform the notification operation by outputting a sound.

In response to a notification termination event of the second notification apparatus being generated (S2193), the user terminal apparatus 200 may transmit the notification termination command to the second notification apparatus 100-2 which is performing the notification operation (S2194). The second notification apparatus 100-2 which receives the notification termination command may terminate the notification operation (S2187). In the example embodiment, the user may sequentially receive notification with respect to the plurality of objects.

The object position notification methods according to the above-described various example embodiments may be implemented with a program including an executable algorithm which may be executed in a computer, and the program may be stored in a non-transitory computer-readable medium and provided. The non-transitory computer-readable medium may be installed in various apparatuses and used.

For example, programs for performing the various methods may be stored in the non-transitory apparatus-readable medium such as a compact disc (CD), a digital versatile disc (DVD), a hard disc, a Blu-ray disc, a USB, a memory card, or a ROM, and provided. Accordingly, the programs may be installed in existing apparatuses, a notification operation may be performed, and thus an apparatus for notifying the user of the position of the object may be implemented.

According to various example embodiments, in response to objects which have no display or speaker but have a short-range wireless communication module, that is, the objects which may not autonomously emit light or output sound such as a remote controller and a car key being searched, an apparatus which is located around the objects and has the display or speaker, that is, the above-described notification apparatus may output sound or emit light other than the object and thus notify the user of the position of the object.

The foregoing example embodiments and advantages are merely examples and are not to be construed as limiting the disclosure. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An apparatus for providing a notification, the apparatus comprising:
   a communication circuitry;
   a processor configured to:
   control the communication circuitry to receive information of an object from an electronic device,
   control to search for whether or not an object corresponding to the received information is located within a preset range through a preset wireless communication method,
   control to perform a notification operation based on a result of the search, and
   control the communication circuitry to receive a result of a search for the object from another notification apparatus, and to control one of the other notification apparatus and the apparatus, which is closer to the object, to perform the notification operation based on the result of the search received from the other notification apparatus and a result of the search performed by the communication circuitry.

2. The apparatus as claimed in claim 1, wherein the processor is configured to control the communication circuitry to transmit the information of the object to the other notification apparatus and to receive the result of the search for the object from the other notification apparatus.

3. The apparatus as claimed in claim 1, wherein the processor is configured to request the result of the search for the object to another notification apparatus which is preregistered in response to the result of the search not being received within a preset time after the information of the object is received from the electronic device.

4. The apparatus as claimed in claim 2, wherein the processor is configured to control the communication circuitry to transmit a notification execution command to the other notification apparatus in response to the other notification apparatus being closer to the object than the notification apparatus.

5. The apparatus as claimed in claim 1, wherein the processor is configured to control the notification apparatus and the other notification apparatus to simultaneously perform the notification operation in response to proximity of the object to the notification apparatus being equal to that of the other notification apparatus.

6. The apparatus as claimed in claim 1, wherein the processor is configured to determine a position of the object based on the result of the search received from the other notification apparatus and the result of the search performed by the communication circuitry and to control the communication circuitry to transmit information of the determined position of the object to the electronic device.

7. The apparatus as claimed in claim 1, further comprising a speaker configured to output a sound,
   wherein the processor is configured to control the speaker to perform the notification operation by outputting the sound.

8. The apparatus as claimed in claim 7, wherein the processor is configured to control the communication circuitry to receive information of a distance between the electronic device and the object from the electronic device, and to control the speaker to output the sound by varying the sound based on the information of the distance between the electronic device and the object.

9. The apparatus as claimed in claim 8, wherein the processor is configured to control the speaker to terminate an output of the sound based on the information of the distance between the electronic device and the object in response to the distance between the electronic device and the object being less than a preset distance.

10. The apparatus as claimed in claim 1, wherein the communication circuitry is configured to support a first communication method and a second communication method different from the first communication method, and the processor is configured to control the communication circuitry to receive the information for the object from the electronic device through the first communication method and to search for whether or not the object corresponding to the received information is located within the preset range through the second communication method.

11. The apparatus as claimed in claim 1, wherein the electronic device is one of a smart phone, a smart watch, a digital camera, or a laptop personal computer (PC).

12. A method for providing a notification of a position of an object by a notification apparatus, the method comprising:
   receiving information of an object from an electronic device;
   searching for whether or not an object corresponding to the received information is located within a preset range through a preset wireless communication method;
   performing a notification operation based on a result of the searching;
   receiving a result regarding searching for the object from another notification apparatus, and
   wherein the performing of the notification operation includes controlling one of the other notification apparatus and the notification apparatus, which is closer to the object, to perform the notification operation based on the result of the searching received from the other notification apparatus and a result of searching searched using the preset wireless communication method.

13. The method as claimed in claim 12, wherein the receiving of the result of the searching for the object from the other notification apparatus includes transmitting the information of the object to the other notification apparatus and receiving the result of the searching for the object from the other notification apparatus.

14. The method as claimed in claim 12, further comprising requesting a result of searching for the object to another notification apparatus which is preregistered in response to the result of the searching not being received within a preset time after the information for the object is received from the electronic device.

15. The method as claimed in claim 13, wherein the performing of the notification operation includes transmitting a notification execution command to the other notification apparatus in response to the other notification apparatus being determined to be closer to the object than the notification apparatus.

16. The method as claimed in claim 12, wherein the performing of the notification operation includes controlling the notification apparatus and the other notification apparatus to simultaneously perform the notification operation in response to proximity of the object to the notification apparatus being equal to that of the other notification apparatus.

17. The method as claimed in claim 12, wherein the performing of the notification operation includes determining a position of the object based on the result of the searching received from the other notification apparatus and the result of the searching searched through the preset wireless communication method and transmitting information for the determined position of the object to the electronic device.

18. A non-transitory recording medium in which a program for executing a method for notifying a position of an object by a notification apparatus is stored, the method comprising:
   receiving information of an object from an electronic device;
   searching for whether or not an object corresponding to the received information is located within a preset range through a preset wireless communication method;
   performing a notification operation based on a result of the searching;
   receiving a result regarding searching for the object from another notification apparatus, and
   wherein the performing of the notification operation includes controlling one of the other notification apparatus and the notification apparatus, which is closer to the object, to perform the notification operation based on the result of the searching received from the other notification apparatus and a result of searching searched using the preset wireless communication method.

* * * * *